(12) United States Patent
Hoadley et al.

(10) Patent No.: US 7,566,671 B2
(45) Date of Patent: Jul. 28, 2009

(54) CLEANING OR DUSTING PAD

(75) Inventors: David A. Hoadley, Racine, WI (US); Ralph Schwarz, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 334 days.

(21) Appl. No.: 11/373,931

(22) Filed: Mar. 13, 2006

(65) Prior Publication Data

US 2006/0185108 A1    Aug. 24, 2006

Related U.S. Application Data

(63) Continuation-in-part of application No. 11/124,878, filed on May 9, 2005, which is a continuation-in-part of application No. 11/045,204, filed on Jan. 28, 2005.

(51) Int. Cl.
     *B32B 5/26*      (2006.01)
     *B32B 27/14*      (2006.01)

(52) U.S. Cl. ................... 442/381; 442/327; 428/198

(58) Field of Classification Search ............... 442/327, 442/381; 428/198
See application file for complete search history.

(56) References Cited

U.S. PATENT DOCUMENTS

| | | | |
|---|---|---|---|
| 781,814 A | 2/1905 | D'Ossone |
| 782,669 A | 2/1905 | Lea |
| 823,725 A | 6/1906 | Hayden |
| 1,250,150 A | 12/1917 | DuBois |
| 1,313,184 A | 8/1919 | Hayden |
| 1,437,145 A | 11/1922 | Johnson |
| 1,542,108 A | 6/1925 | Taylor |
| 1,637,595 A | 8/1927 | Sturgis |
| 1,722,162 A | 7/1929 | Teetsell |
| 1,804,415 A | 5/1931 | Hales |
| 1,978,748 A | 10/1934 | Gregory |
| 2,037,135 A | 4/1936 | Johnson et al. |
| 2,047,199 A | 7/1936 | Gewalt |
| 2,068,162 A | 1/1937 | Borchers |
| 2,151,425 A | 3/1939 | Gregory |
| 2,185,873 A | 1/1940 | Underhill |
| 2,262,888 A | 11/1941 | Dodge |
| 2,679,064 A | 5/1954 | Palma, Jr. et al. |

(Continued)

FOREIGN PATENT DOCUMENTS

CA      2 384 357 A1      3/2002

(Continued)

OTHER PUBLICATIONS

International Search Report & Written Opinion for PCT/US2007/014346 dated Nov. 28, 2007.

(Continued)

*Primary Examiner*—Norca L Torres-Velazquez

(57) ABSTRACT

A cleaning pad 28 is disclosed. The cleaning pad 28 includes a cleaning pad that includes a combination of fibers 203 bonded to a base sheet 402 such that 100% of the fibers are bonded to the base sheet 402 at a first joining location 407 and between 5-90% are bonded to the base sheet at a second joining location 444. The first and second joining locations may take a variety of forms such as discrete points, points on a line, or sections of a line.

42 Claims, 19 Drawing Sheets

U.S. PATENT DOCUMENTS

| | | |
|---|---|---|
| 2,755,498 A | 7/1956 | Park |
| 2,808,605 A | 10/1957 | Licata |
| 2,816,313 A | 12/1957 | Beck et al. |
| 2,862,217 A | 12/1958 | Small et al. |
| 2,877,482 A | 3/1959 | Roy |
| 2,935,754 A | 5/1960 | Abdo |
| 3,066,344 A | 12/1962 | Garcia Borras et al. |
| 3,196,475 A | 7/1965 | Brown |
| 3,221,356 A | 12/1965 | Schirmer |
| 3,406,694 A | 10/1968 | Odence |
| 3,505,155 A | 4/1970 | Balch et al. |
| 3,525,113 A | 8/1970 | Leland |
| 3,528,076 A | 9/1970 | Anderson |
| 3,605,882 A | 9/1971 | Thomas |
| 3,655,501 A | 4/1972 | Tesch |
| 3,687,797 A | 8/1972 | Wideman |
| 3,760,450 A | 9/1973 | Griffin et al. |
| 3,822,435 A | 7/1974 | Moss |
| 3,965,518 A | 6/1976 | Muoio |
| 3,979,163 A | 9/1976 | Beard |
| 4,010,511 A | 3/1977 | Komatsu |
| 4,018,646 A | 4/1977 | Ruffo et al. |
| 4,041,203 A | 8/1977 | Brock et al. |
| 4,114,224 A | 9/1978 | Disko |
| 4,196,245 A | 4/1980 | Kitson et al. |
| 4,254,738 A | 3/1981 | Stanley |
| 4,298,649 A | 11/1981 | Meitner |
| 4,309,469 A | 1/1982 | Varona |
| 4,313,774 A | 2/1982 | Arthur |
| 4,364,144 A | 12/1982 | Moss et al. |
| 4,376,147 A | 3/1983 | Byrne et al. |
| 4,377,615 A | 3/1983 | Suzuki et al. |
| D268,967 S | 5/1983 | Sami |
| D268,968 S | 5/1983 | Sami |
| 4,426,417 A | 1/1984 | Meitner et al. |
| 4,432,472 A | 2/1984 | Lamm |
| 4,436,780 A | 3/1984 | Hotchkiss et al. |
| 4,469,734 A | 9/1984 | Minto et al. |
| 4,469,735 A | 9/1984 | Trokhan |
| 4,473,918 A | 10/1984 | Moss et al. |
| 4,487,795 A | 12/1984 | Yasuda et al. |
| 4,510,640 A | 4/1985 | Omori |
| 4,546,029 A | 10/1985 | Cancio et al. |
| 4,601,938 A | 7/1986 | Deacon et al. |
| 4,609,518 A | 9/1986 | Curro et al. |
| 4,623,575 A | 11/1986 | Brooks et al. |
| 4,685,167 A | 8/1987 | Murray |
| 4,705,420 A | 11/1987 | Bokmiller et al. |
| 4,710,185 A | 12/1987 | Sneyd, Jr. et al. |
| 4,713,274 A | 12/1987 | Minor |
| 4,776,716 A | 10/1988 | Huang |
| 4,788,735 A | 12/1988 | Fuk Fan |
| 4,802,782 A | 2/1989 | Scalf |
| 4,806,037 A | 2/1989 | Berglund |
| 4,829,622 A | 5/1989 | O'Sullivan |
| 4,859,519 A | 8/1989 | Cabe, Jr. et al. |
| 4,906,513 A | 3/1990 | Kebbell et al. |
| 4,926,515 A | 5/1990 | Lynn et al. |
| 4,954,001 A | 9/1990 | Billat |
| 4,983,060 A | 1/1991 | Steinbach |
| 4,991,362 A | 2/1991 | Heyer et al. |
| 4,995,133 A | 2/1991 | Newell |
| 5,039,431 A | 8/1991 | Johnson et al. |
| 5,062,729 A | 11/1991 | Yamamoto |
| 5,071,489 A | 12/1991 | Silvenis et al. |
| 5,141,348 A | 8/1992 | 'tartt |
| 5,143,774 A | 9/1992 | Cancio et al. |
| 5,229,191 A | 7/1993 | Austin |
| 5,427,838 A | 6/1995 | Yamamoto et al. |
| 5,429,854 A | 7/1995 | Currie et al. |
| 5,452,491 A | 9/1995 | Thompson |
| 5,466,318 A | 11/1995 | Bjork |
| 5,477,582 A | 12/1995 | Yamashita |
| 5,525,397 A | 6/1996 | Shizuno et al. |
| 5,572,763 A | 11/1996 | Eguchi |
| 5,573,719 A | 11/1996 | Fitting |
| 5,603,139 A | 2/1997 | Alazet |
| 5,613,263 A | 3/1997 | Nolte |
| 5,715,560 A | 2/1998 | Banicki |
| D391,711 S | 3/1998 | Hanaoka et al. |
| 5,722,966 A | 3/1998 | Christon et al. |
| 5,735,620 A | 4/1998 | Ford |
| 5,769,324 A | 6/1998 | Lenhart |
| 5,779,155 A | 7/1998 | Schennum et al. |
| 5,815,878 A | 10/1998 | Murakami et al. |
| 5,839,150 A | 11/1998 | Miyaoka |
| 5,842,488 A | 12/1998 | Belleau et al. |
| 5,845,361 A | 12/1998 | Murakami et al. |
| 5,865,551 A | 2/1999 | Lalli et al. |
| 5,888,006 A | 3/1999 | Ping et al. |
| 5,895,504 A | 4/1999 | Sramek et al. |
| 5,908,255 A | 6/1999 | Branch |
| 5,953,784 A | 9/1999 | Suzuki et al. |
| 5,958,555 A | 9/1999 | Takeuchi et al. |
| 5,960,508 A | 10/1999 | Holt et al. |
| 5,962,112 A | 10/1999 | Haynes et al. |
| 5,980,673 A | 11/1999 | Takeuchi et al. |
| 6,013,349 A | 1/2000 | Takeuchi et al. |
| 6,047,435 A | 4/2000 | Suzuki et al. |
| 6,054,202 A | 4/2000 | Takeuchi et al. |
| 6,119,298 A | 9/2000 | Kenmochi |
| 6,142,750 A | 11/2000 | Benecke |
| 6,143,393 A | 11/2000 | Abe et al. |
| 6,202,246 B1 | 3/2001 | Boucher |
| 6,202,250 B1 | 3/2001 | Kenmochi et al. |
| 6,206,058 B1 | 3/2001 | Nagel et al. |
| 6,241,835 B1 | 6/2001 | Abe et al. |
| 6,245,413 B1 | 6/2001 | Kenmochi et al. |
| 6,298,517 B1 | 10/2001 | McKay |
| 6,305,046 B1 | 10/2001 | Kingry et al. |
| 6,309,731 B1 | 10/2001 | Takeuchi et al. |
| 6,315,478 B1 | 11/2001 | Atkins |
| 6,329,308 B1 | 12/2001 | Kenmochi et al. |
| 6,361,638 B2 | 3/2002 | Takai et al. |
| 6,405,403 B1 | 6/2002 | McKay |
| 6,406,206 B1 | 6/2002 | Girardot et al. |
| 6,506,472 B1 | 1/2003 | Tanaka et al. |
| 6,513,184 B1 | 2/2003 | Brown et al. |
| 6,540,424 B1 | 4/2003 | Hall et al. |
| 6,551,001 B2 | 4/2003 | Aberegg et al. |
| 6,554,937 B1 | 4/2003 | Kenmochi et al. |
| 6,557,178 B1 | 5/2003 | Hoover |
| 6,572,602 B2 | 6/2003 | Furuya et al. |
| 6,651,290 B2 | 11/2003 | Kingry et al. |
| 6,669,391 B2 | 12/2003 | Policicchio et al. |
| 6,672,313 B2 | 1/2004 | Battaglia et al. |
| 6,681,434 B2 | 1/2004 | Smith |
| 6,687,942 B1 | 2/2004 | Pember |
| 6,687,944 B2 | 2/2004 | Young |
| 6,716,514 B2 | 4/2004 | Nissing |
| 6,722,806 B2 | 4/2004 | Kunkler et al. |
| 6,742,717 B2 | 6/2004 | Aberegg et al. |
| 6,742,951 B2 | 6/2004 | Schultz et al. |
| 6,750,187 B2 | 6/2004 | Alam et al. |
| 6,758,412 B2 | 7/2004 | Aberegg et al. |
| 6,777,064 B1 | 8/2004 | Brown et al. |
| 6,794,351 B2 | 9/2004 | Shick et al. |
| 6,797,400 B2 | 9/2004 | Weuthen et al. |
| 6,807,702 B2 | 10/2004 | Keck et al. |
| 6,810,554 B2 | 11/2004 | McKay |
| 6,813,801 B2 | 11/2004 | Tanaka et al. |
| 6,815,502 B1 | 11/2004 | Lang et al. |
| 6,828,014 B2 | 12/2004 | Branham et al. |
| 6,828,290 B1 | 12/2004 | Evers et al. |

| | | | | | | |
|---|---|---|---|---|---|---|
| 6,835,678 | B2 | 12/2004 | Jackson et al. | EP | 0 739 600 A1 | 10/1996 |
| 6,851,881 | B2 | 2/2005 | Slaboden | EP | 0 774 229 A2 | 5/1997 |
| 6,855,790 | B2 | 2/2005 | Chang et al. | EP | 0 777 997 A2 | 6/1997 |
| 6,887,807 | B1 | 5/2005 | Matsushita et al. | EP | 0790286 A | 8/1997 |
| 6,953,299 | B2 | 10/2005 | Wang et al. | EP | 0 848 927 A1 | 6/1998 |
| 6,960,042 | B1 | 11/2005 | Hsiao | EP | 0 863 240 A1 | 9/1998 |
| 6,968,591 | B2 | 11/2005 | Tanaka | EP | 0 864 289 A2 | 9/1998 |
| 7,241,413 | B2 | 7/2007 | Pfenniger et al. | EP | 0 943 425 A1 | 9/1999 |
| 7,427,434 | B2 | 9/2008 | Busam et al. | EP | 0 945 251 A1 | 9/1999 |
| 2002/0132098 | A1 | 9/2002 | Miyazawa et al. | EP | 0 959 164 A1 | 11/1999 |
| 2002/0147122 | A1 | 10/2002 | Shick et al. | EP | 0 968 677 A2 | 1/2000 |
| 2002/0148061 | A1 | 10/2002 | Tanaka et al. | EP | 0 872 206 B1 | 7/2000 |
| 2003/0000039 | A1 | 1/2003 | Borcherds | EP | 1 095 763 A1 | 5/2001 |
| 2003/0074756 | A1 | 4/2003 | Policicchio et al. | EP | 1 147 734 A2 | 10/2001 |
| 2003/0106568 | A1 | 6/2003 | Keck et al. | EP | 0 986 322 B1 | 12/2001 |
| 2003/0126710 | A1 | 7/2003 | Policicchio et al. | EP | 0 968 677 A3 | 1/2002 |
| 2003/0159223 | A1 | 8/2003 | Plankenhorn | EP | 1 021 121 B1 | 6/2002 |
| 2003/0180083 | A1 | 9/2003 | Hall et al. | EP | 1 211 342 A1 | 6/2002 |
| 2003/0182751 | A1 | 10/2003 | White | EP | 1 212 972 A2 | 6/2002 |
| 2003/0194259 | A1 | 10/2003 | Kunkler et al. | EP | 1 222 915 A2 | 7/2002 |
| 2003/0200991 | A1 | 10/2003 | Keck et al. | EP | 0 865 755 B1 | 5/2003 |
| 2003/0211802 | A1 | 11/2003 | Keck et al. | EP | 1 314 390 A1 | 5/2003 |
| 2003/0233718 | A1 | 12/2003 | Heathcock et al. | EP | 0 923 902 B1 | 7/2003 |
| 2003/0235463 | A1 | 12/2003 | Neumann et al. | EP | 0 983 014 B1 | 12/2003 |
| 2004/0016074 | A1 | 1/2004 | Tanaka | EP | 0 841 879 B1 | 7/2004 |
| 2004/0022575 | A1 | 2/2004 | Hall et al. | EP | 1 213 230 B1 | 1/2005 |
| 2004/0034956 | A1 | 2/2004 | Tanaka et al. | EP | 1 498 028 A1 | 1/2005 |
| 2004/0086320 | A1 | 5/2004 | Policicchio et al. | EP | 1 250 220 B1 | 4/2005 |
| 2004/0141797 | A1 | 7/2004 | Garabedian et al. | EP | 1 523 919 A1 | 4/2005 |
| 2004/0141798 | A1 | 7/2004 | Garabedian, Jr. et al. | EP | 1 523 920 A1 | 4/2005 |
| 2004/0144406 | A1 | 7/2004 | Garabedian et al. | EP | 1 523 921 A2 | 4/2005 |
| 2004/0178224 | A1 | 9/2004 | Fahy et al. | EP | 1 523 922 A2 | 4/2005 |
| 2004/0184867 | A1 | 9/2004 | Wang et al. | EP | 1 523 923 A2 | 4/2005 |
| 2004/0216771 | A1 | 11/2004 | Hall et al. | EP | 1 523 924 A2 | 4/2005 |
| 2004/0226123 | A1 | 11/2004 | Policicchio et al. | EP | 1 523 925 A2 | 4/2005 |
| 2005/0000050 | A1 | 1/2005 | Galvin et al. | EP | 1 537 819 A2 | 6/2005 |
| 2005/0004546 | A1 | 1/2005 | Mizutani et al. | EP | 1 547 513 A2 | 6/2005 |
| 2005/0016035 | A1 | 1/2005 | Kobayashi et al. | EP | 1 302 146 B1 | 7/2005 |
| 2005/0039285 | A1 | 2/2005 | Tanaka et al. | EP | 1 550 395 A2 | 7/2005 |
| 2005/0085407 | A1 | 4/2005 | Oldenhove et al. | EP | 1 552 890 A1 | 7/2005 |
| 2005/0097691 | A1 | 5/2005 | Tsuchiya et al. | EP | 1 554 967 A2 | 7/2005 |
| 2005/0097695 | A1 | 5/2005 | Tanaka et al. | EP | 1 566 135 A1 | 8/2005 |
| 2005/0097696 | A1 | 5/2005 | Tanaka et al. | EP | 1 591 053 A1 | 11/2005 |
| 2005/0102781 | A1 | 5/2005 | Tsuchiya et al. | EP | 1 591 575 A1 | 11/2005 |
| 2005/0132521 | A1 | 6/2005 | Tanaka et al. | EP | 1731076 A | 12/2006 |
| 2005/0136775 | A1 | 6/2005 | Tanaka | GB | 2 369 560 A | 6/2002 |
| 2005/0137555 | A1 | 6/2005 | Mizutani et al. | GB | 2 395 680 A | 6/2004 |
| 2005/0144747 | A1 | 7/2005 | Juan | GB | 2414654 A | 12/2005 |
| 2005/0172440 | A1 | 8/2005 | Lin | JP | 39-6833 | 3/1939 |
| 2005/0177967 | A1 | 8/2005 | Tanaka et al. | JP | 60-63157 | 5/1985 |
| 2005/0188490 | A1 | 9/2005 | Tanaka et al. | JP | 04250130 A | 9/1992 |
| 2005/0193513 | A1 | 9/2005 | Tanaka et al. | JP | 04288113 A | 10/1992 |
| 2005/0193514 | A1 | 9/2005 | Tanaka et al. | JP | 04312430 A | 11/1992 |
| 2005/0198760 | A1 | 9/2005 | Tanaka et al. | JP | 05025763 | 2/1993 |
| 2005/0202190 | A1 | 9/2005 | Ledger et al. | JP | 05056902 A | 3/1993 |
| 2005/0221070 | A1 | 10/2005 | Bando et al. | JP | 05115403 A | 5/1993 |
| 2007/0084005 | A1 | 4/2007 | Lin et al. | JP | 05192285 A | 8/1993 |
| | | | | JP | 05245090 A | 9/1993 |
| | | FOREIGN PATENT DOCUMENTS | | JP | 05285435 A | 11/1993 |
| | | | | JP | 06014858 A | 1/1994 |
| CA | | 2492582 A1 | 1/2004 | JP | 06014859 A | 1/1994 |
| CA | | 2552299 A1 | 10/2005 | JP | 06017356 | 1/1994 |
| CH | | 152201 | 4/1932 | JP | 06162712 A | 6/1994 |
| DE | | 279 352 | 10/1913 | JP | 06182310 A | 7/1994 |
| DE | | 827344 | 1/1952 | JP | 07011269 A | 1/1995 |
| DE | | 1 771 672 | 2/1972 | JP | 07169098 A | 7/1995 |
| DE | | 43 30 357 A1 | 2/1995 | JP | 07184815 A | 7/1995 |
| DE | | 295 16 181 U1 | 10/1995 | JP | 07254169 A | 10/1995 |
| DE | | 297 01 349 U1 | 1/1997 | JP | 08043272 A | 2/1996 |
| DE | | 196 30 522 A1 | 2/1998 | JP | 08092530 A | 4/1996 |
| EP | | 0 097 036 A2 | 12/1983 | JP | 08133290 A | 5/1996 |
| EP | | 0 399 495 A1 | 11/1990 | JP | 08187210 A | 7/1996 |
| EP | | 0 468 301 A1 | 1/1992 | JP | 08243065 A | 9/1996 |

| | | | | | | |
|---|---|---|---|---|---|---|
| JP | 08291456 A | 11/1996 | | JP | 2001269300 A | 10/2001 |
| JP | 08293180 A | 11/1996 | | JP | 2001275875 A | 10/2001 |
| JP | 08297949 A | 11/1996 | | JP | 2001299658 A | 10/2001 |
| JP | 08302314 A | 11/1996 | | JP | 2001299659 A | 10/2001 |
| JP | 08302550 A | 11/1996 | | JP | 2001310168 A | 11/2001 |
| JP | 09038009 A | 2/1997 | | JP | 2001354238 A | 12/2001 |
| JP | 09055055 A | 2/1997 | | JP | 2002000645 A | 1/2002 |
| JP | 09055056 A | 2/1997 | | JP | 2002119451 A | 4/2002 |
| JP | 09098920 | 4/1997 | | JP | 2002119929 A | 4/2002 |
| JP | 09131288 | 5/1997 | | JP | 2002145367 A | 5/2002 |
| JP | 09135798 | 5/1997 | | JP | 2002165742 | 6/2002 |
| JP | 09140650 A | 6/1997 | | JP | 2002191536 A | 7/2002 |
| JP | 09154519 A | 6/1997 | | JP | 2002233486 A | 8/2002 |
| JP | 09154791 A | 6/1997 | | JP | 2002240179 A | 8/2002 |
| JP | 09188950 A | 7/1997 | | JP | 20002253459 A | 9/2002 |
| JP | 09224895 | 9/1997 | | JP | 2002306389 A | 10/2002 |
| JP | 09253017 | 9/1997 | | JP | 2002315704 A | 10/2002 |
| JP | 09255679 | 9/1997 | | JP | 2002363509 A | 12/2002 |
| JP | 09273061 A | 10/1997 | | JP | 2002369783 A | 12/2002 |
| JP | 09276193 | 10/1997 | | JP | 2003000234 A | 1/2003 |
| JP | 09319305 A | 12/1997 | | JP | 2003024254 A | 1/2003 |
| JP | 09322876 A | 12/1997 | | JP | 2003111701 A | 4/2003 |
| JP | 09322877 A | 12/1997 | | JP | 2003111703 A | 4/2003 |
| JP | 09324354 | 12/1997 | | JP | 2003111704 A | 4/2003 |
| JP | 10005159 A | 1/1998 | | JP | 2003164402 A | 6/2003 |
| JP | 10005164 A | 1/1998 | | JP | 2003164407 A | 6/2003 |
| JP | 10033170 A | 2/1998 | | JP | 2003164408 A | 6/2003 |
| JP | 10033343 A | 2/1998 | | JP | 2003190074 A | 7/2003 |
| JP | 10033443 A | 2/1998 | | JP | 2003199698 A | 7/2003 |
| JP | 10043115 A | 2/1998 | | JP | 2003204911 A | 7/2003 |
| JP | 10099246 A | 4/1998 | | JP | 2003238394 A | 8/2003 |
| JP | 10127547 A | 5/1998 | | JP | 2003261899 A | 9/2003 |
| JP | 10137168 | 5/1998 | | JP | 2003265387 A | 9/2003 |
| JP | 10146306 A | 6/1998 | | JP | 2003265391 A | 9/2003 |
| JP | 10155713 A | 6/1998 | | JP | 2003284660 A | 10/2003 |
| JP | 10203542 A | 8/1998 | | JP | 2003319898 A | 11/2003 |
| JP | 10216060 | 8/1998 | | JP | 2004033237 A | 2/2004 |
| JP | 10-235574 A | 9/1998 | | JP | 2004033238 A | 2/2004 |
| JP | 10237235 A | 9/1998 | | JP | 2004049605 A | 2/2004 |
| JP | 10245756 | 9/1998 | | JP | 2004057242 A | 2/2004 |
| JP | 10262888 A | 10/1998 | | JP | 2004057244 A | 2/2004 |
| JP | 10276953 | 10/1998 | | JP | 2004065387 A | 3/2004 |
| JP | 10286206 | 10/1998 | | JP | 2004089288 A | 3/2004 |
| JP | 10286209 | 10/1998 | | JP | 2004141369 A | 5/2004 |
| JP | 10328107 | 12/1998 | | JP | 2004167274 A | 6/2004 |
| JP | 11000295 A | 1/1999 | | JP | 2004208917 A | 7/2004 |
| JP | 11019015 | 1/1999 | | JP | 2004208939 A | 7/2004 |
| JP | 11089776 A | 4/1999 | | JP | 2004208941 A | 7/2004 |
| JP | 11156979 | 6/1999 | | JP | 2004223022 A | 8/2004 |
| JP | 11156980 | 6/1999 | | JP | 2004223692 A | 8/2004 |
| JP | 11156981 | 6/1999 | | JP | 2004237023 A | 8/2004 |
| JP | 11241099 A | 9/1999 | | JP | 2004275605 A | 10/2004 |
| JP | 11269750 | 10/1999 | | JP | 2004298650 A | 10/2004 |
| JP | 11276401 | 10/1999 | | JP | 2004351070 A | 12/2004 |
| JP | 11276402 | 10/1999 | | JP | 2005 021709 A | 1/2005 |
| JP | 11302688 A | 11/1999 | | JP | 2005006778 A | 1/2005 |
| JP | 11318789 A | 11/1999 | | JP | 2005007094 A | 1/2005 |
| JP | 11332777 A | 12/1999 | | JP | 2005040641 A | 2/2005 |
| JP | 11332778 A | 12/1999 | | JP | 2005046645 A | 2/2005 |
| JP | 2000034663 A | 2/2000 | | JP | 2005087506 A | 4/2005 |
| JP | 2000083883 | 3/2000 | | JP | 2005095643 A | 4/2005 |
| JP | 20000166841 | 6/2000 | | JP | 2005095665 A | 4/2005 |
| JP | 2000210238 A | 8/2000 | | JP | 2005111284 A | 4/2005 |
| JP | 20000212879 | 8/2000 | | JP | 2005118392 A | 5/2005 |
| JP | 2000254088 A | 9/2000 | | JP | 2005124857 A | 5/2005 |
| JP | 2000254089 A | 9/2000 | | JP | 2005131422 A | 5/2005 |
| JP | 20000245670 | 9/2000 | | JP | 2005137603 A | 6/2005 |
| JP | 2000296084 | 10/2000 | | JP | 2005137929 A | 6/2005 |
| JP | 2001003094 A | 1/2001 | | JP | 2005137930 A | 6/2005 |
| JP | 2001059098 A | 3/2001 | | JP | 2005137931 A | 6/2005 |
| JP | 2001190487 A | 7/2001 | | JP | 2005143523 A | 6/2005 |
| JP | 2001198065 A | 7/2001 | | JP | 2005144111 A | 6/2005 |
| JP | 2001198066 A | 7/2001 | | JP | 2005144198 A | 6/2005 |

| | | | |
|---|---|---|---|
| JP | 2005144199 A | 6/2005 | |
| JP | 2005160721 A | 6/2005 | |
| JP | 2005168711 A | 6/2005 | |
| JP | 2005169096 A | 6/2005 | |
| JP | 2005169148 A | 6/2005 | |
| JP | 2005199077 A | 7/2005 | |
| JP | 200615164 A | 1/2006 | |
| JP | 2006230536 A | 9/2006 | |
| WO | WO 97/49326 | 12/1997 | |
| WO | WO 98/52458 | 11/1998 | |
| WO | WO 99/07272 | 2/1999 | |
| WO | WO 99/07273 | 2/1999 | |
| WO | WO 99/23291 | 5/1999 | |
| WO | WO 99/37842 | 7/1999 | |
| WO | WO 00/08998 | 2/2000 | |
| WO | WO 00/53407 | 9/2000 | |
| WO | WO 01/22861 A2 | 4/2001 | |
| WO | WO 01/40558 A2 | 6/2001 | |
| WO | WO 01/41622 A2 | 6/2001 | |
| WO | WO 01/45616 A1 | 6/2001 | |
| WO | WO 01/52713 A2 | 7/2001 | |
| WO | WO 01/71081 A1 | 9/2001 | |
| WO | WO 01/80705 A2 | 11/2001 | |
| WO | WO 01/85452 A1 | 11/2001 | |
| WO | WO 01/92622 A1 | 12/2001 | |
| WO | WO 02/00819 A1 | 1/2002 | |
| WO | WO 02/03847 A2 | 1/2002 | |
| WO | WO 02/34101 A1 | 5/2002 | |
| WO | WO 02/38027 A2 | 5/2002 | |
| WO | WO 02/38846 A2 | 5/2002 | |
| WO | WO 02/41745 A1 | 5/2002 | |
| WO | WO 02/43536 A2 | 6/2002 | |
| WO | WO 02/45564 A2 | 6/2002 | |
| WO | WO 02/053694 A1 | 7/2002 | |
| WO | WO 02/065887 A1 | 8/2002 | |
| WO | WO 02/091900 A1 | 11/2002 | |
| WO | WO/02/102221 A1 | 12/2002 | |
| WO | WO 03/000165 A1 | 1/2003 | |
| WO | WO 03/001962 A1 | 1/2003 | |
| WO | WO 03/004748 A1 | 1/2003 | |
| WO | WO 03/039321 A1 | 5/2003 | |
| WO | WO 03/059139 A1 | 7/2003 | |
| WO | WO 03/070080 A1 | 8/2003 | |
| WO | WO 03/093557 A1 | 11/2003 | |
| WO | WO 03/099517 A1 | 12/2003 | |
| WO | WO 2004/020725 A1 | 3/2004 | |
| WO | WO 2004/022832 A1 | 3/2004 | |
| WO | WO 2004/044298 A1 | 5/2004 | |
| WO | WO 2004/048047 A1 | 6/2004 | |
| WO | WO 2004/060130 A1 | 7/2004 | |
| WO | WO 2004/061185 A1 | 7/2004 | |
| WO | WO 2004/061187 A1 | 7/2004 | |
| WO | WO 2004/064590 A2 | 8/2004 | |
| WO | WO 2004/073479 A2 | 9/2004 | |
| WO | WO 2005/002842 A1 | 1/2005 | |
| WO | WO 2005/065517 A2 | 7/2005 | |
| WO | WO 2005/099552 A2 | 10/2005 | |
| WO | WO 2005/100520 A1 | 10/2005 | |
| WO | WO 2005/100521 A1 | 10/2005 | |
| WO | WO 2005/100523 A1 | 10/2005 | |
| WO | WO 2005/100526 A1 | 10/2005 | |
| WO | WO 2005/100527 A1 | 10/2005 | |
| WO | WO 2005/103217 A1 | 11/2005 | |
| WO | WO 2005/103218 A1 | 11/2005 | |
| WO | WO 2005/103244 A1 | 11/2005 | |
| WO | WO 2005/103354 A1 | 11/2005 | |
| WO | WO 2005/103355 A1 | 11/2005 | |
| WO | WO 2005/103357 A1 | 11/2005 | |
| WO | WO 2006070502 A1 | 7/2006 | |

OTHER PUBLICATIONS

International Search Report and Written Opinion dated Aug. 30, 2007, Appl. No. PCT/US/2007/005973.
U.S. Appl. No. 11/124,527 to Hoadley et al.; Office Action dated Dec. 22, 2008.
U.S. Appl. No. 10/577,992 to Kikuo Yamada; Office Action dated Nov. 16, 2007.
U.S. Appl. No. 10/577,992 to Kikuo Yamada; Office Action dated Jun. 11, 2008.
U.S. Appl. No. 10/577,992 to Kikuo Yamada; Office Action dated Feb. 26, 2009.

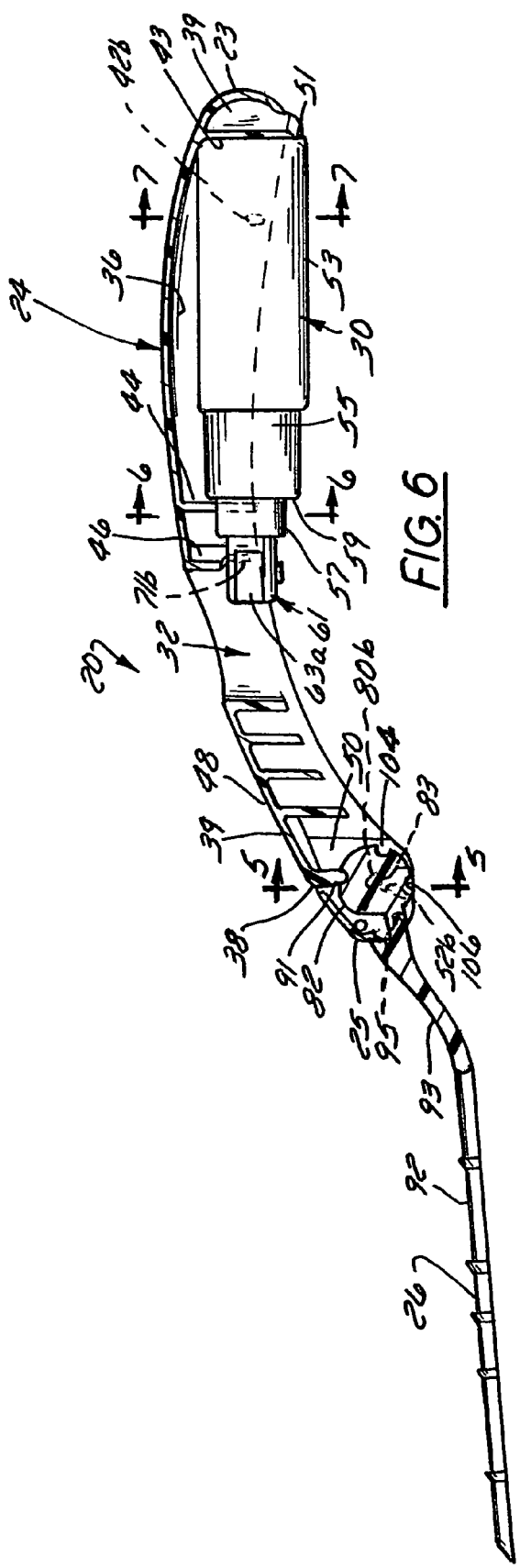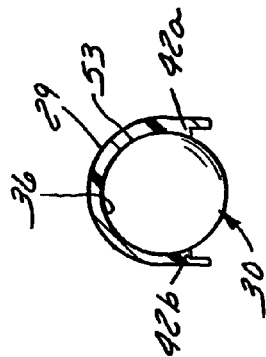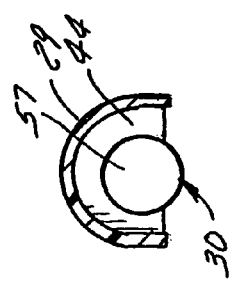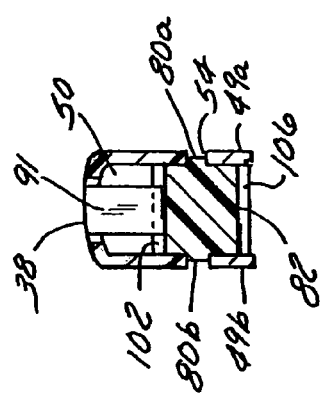

CLEANING OR DUSTING PAD

CROSS-REFERENCE TO RELATED APPLICATIONS

This application is a continuation-in-part of U.S. patent application Ser. No. 11/124,878 filed May 9, 2005, which is a continuation-in-part of U.S. patent application Ser. No. 11/045,204, filed Jan. 28, 2005, the entirety of which is incorporated by reference herein.

BACKGROUND OF THE INVENTION

1. Field of the Invention

The present invention relates to the field of cleaning devices such as hand held dusters and dust mops. More particularly, the present invention relates to an improved cleaning pad that exhibits more free fiber, greater fluffiness and greater dust adhesion.

2. Discussion of the Related Art

For decades, hand held feather dusters, dust rags and other cleaning implements have been used as cleaning tools for the removal of dust adhering to furniture such as dressers and coffee tables, electrical appliances such as computers, lights, interior walls, lintels and the like. Thus, it is generally well known to remove dust or dirt from floors, furniture, and other household surfaces by rubbing a dust rag, cloth or other cleaning implement against the surface such that the dust or dirt adheres to the cleaning implement.

Throughout the last half-century, new cleaning implements have been developed to assist the individual in dusting and similar cleaning chores. While hand held dusters and other cleaning implements are generally well known in the art, numerous drawbacks exist with the current commercially available designs. For example, US Application Pub. No. U.S. 2004/0034956 A1, U.S. Pat. No. 6,813,801, U.S. Pat. No. 5,953,784 and U.S. Pat. No. 6,550,092 disclose variations of hand held cleaning devices incorporating a disposable cleaning pad. These devices, while somewhat suitable for the desired application, exhibit notable limitations.

However, there is a need to improve the cloths associated with such systems and how they are used. Many of the known disposable dusting or cleaning cloths include fabrics that do not adequately retain water and/or dust. FIG. 33 illustrates one example of a prior art cleaning pad 800. The cleaning pad 800 includes a fiber bundle or fiber mat 807 bonded to a base sheet 802. As illustrated by FIG. 33, the individual fibers of the fiber mat 807 are bonded to the base sheet 802 at bonding lines 806a, 806b. In addition, the fibers of the fiber mat 807 are bonded at joining lines 810. This bonding architecture results in a tightly bonded fiber mat 807, with extremely minimal amounts of free fibers in the fiber mat 807. As a result, the prior art cleaning pad 800 has a tendency to push dust across a surface as opposed to retaining and absorbing dust.

While some improvements to dusting cloths are disclosed in the art, there remains a need for an improved cleaning pad and fiber orientation that maximizes the retention of the dusting pad.

SUMMARY AND OBJECTS OF THE INVENTION

Consistent with the foregoing, and in accordance with the invention as embodied and broadly described herein, preferred embodiments of a cleaning pad are disclosed in suitable detail to enable one of ordinary skill in the art to make and use the invention.

In one preferred embodiment a cleaning pad includes at least one nonwoven sheet and a combination of fibers connected to the nonwoven sheet at a plurality of spots. In another embodiment, a single bonding line also connects the combination of fibers to the nonwoven sheet. The bonding line may be discontinuous or discontinuous or broken. At least one of the fibers and the sheet are comprised of a material allowing for thermal welding the combination of fibers and sheet together.

In one embodiment, 100% of the fibers are connected to the nonwoven sheet at one spot and between 5-90% of the fibers are connected at at least two spots. In an alternative embodiment, between 5-70% of the fibers are connected at at least two spots or less than 80% of the fibers are bonded at at least two spots. Alternatively, 100% of the fibers may be connected to the nonwoven sheet at the bonding line and between 5-90%, 5-70%, or less than 80% of the fibers may be connected at at least one spot.

In another embodiment, between 10-90% of the fibers are connected to the discontinuous bonding line. Alternatively, about 80% of the fibers are bonded to the discontinuous bonding line. In yet another embodiment, 80% of the total fiber bundle comprises fibers that are free along at least 50% of their length from the bonding line.

In yet another embodiment, a cleaning pad includes a combination of strips and at least one nonwoven. The cleaning pad includes 100% of the strips bonded to the nonwoven at a first joining location and between 5-90% bonded at a second joining location. The first and second joining locations may include discrete points randomly orientated on the nonwoven or orientated in lines. In one embodiment, the first joining location is a joining line. The second joining location may include a plurality of discrete points arranged in lines on opposed sides of the joining line. Between 5-70% or less than 80% of the fibers are joined at at least two joining locations. In one embodiment, between 10-90% of the fibers are joined to a discontinuous joining line. In another embodiment, about 80% of the total fiber bundle comprises fibers that are free along at least 50% of their length from the joining line.

In still another embodiment, a cleaning pad includes a fiber bundle attached to a nonwoven sheet such that a plurality of individual discrete micro channels are defined within the fiber bundle for retaining dust. The fiber bundle is bonded to the base sheet by a plurality of joining points that define a plurality of discrete fiber clusters. The micro channels are formed between the fibers of the fiber clusters. The joining points may randomly orientated on the nonwoven sheet or orientated in lines.

In another embodiment, a cleaning pad includes an open fiber bundle bonded to a nonwoven material such that 80% of the total fiber bundle comprises fibers that are not bonded along at least 50% of their length from a first bonding location.

In yet another embodiment, a cleaning pad includes a base sheet that includes an outer unperforated, uncut outer edge and a combination of fibers connected to the nonwoven sheet, at at least one joining location. The outer edge may be rectangular and defined by a straight uncut upper edge, a straight uncut lower edge and two straight, unperforated, uncut side edges. Alternatively, the outer edge could be nonlinear. The joining portions may be points, dashes, shaped spots such as triangular shaped spots or star-shaped spots.

In a final embodiment, a cleaning pad includes a base sheet and a combination of fibers connected to the nonwoven sheet at at least one point along a curved bonding line. The curved bonding line preferably defines a plurality of discrete bonding locations.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 6 is a vertical cross-sectional view of the cleaning system taken along the longitudinal axis of the device illustrated FIGS. 1-5;

FIG. 7 is a sectional view taken along line 5-5 of FIG. 6;

FIG. 8 is a sectional view taken along line 6-6 of FIG. 6;

FIG. 9 is a sectional view taken along line 7-7 of FIG. 6;

Figure 1:
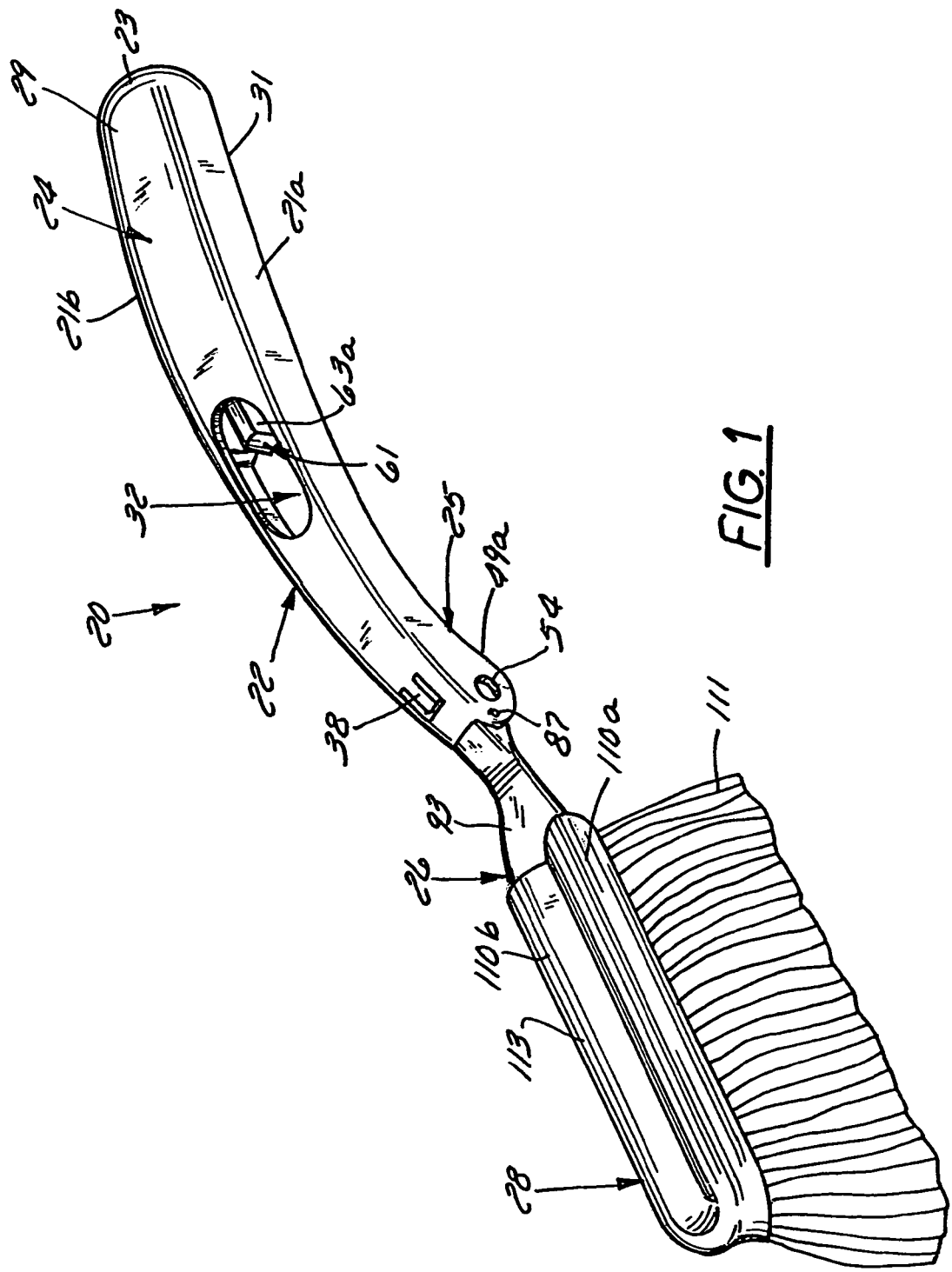
FIG. 1 is a perspective view of a first embodiment of an assembled cleaning system capable of wet or dry cleaning.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the word connected or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

In a basic form, the inventive cleaning pad includes a cleaning pad that includes a combination of fiber bonded to a base sheet such that 100% of the fibers are bonded to the base sheet at a first joining location and between 5-90% are bonded to the base sheet at a second joining location. The first and second joining locations may take a variety of forms such as discrete points, points on a line, sections of a line or shapes. The inventive cleaning pad results in fiber layer that is more open, fluffier and exhibits greater dust adhesion.

2. Detailed Description of Preferred Embodiments

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the below examples should not be construed as limiting the scope of the present invention.

a. The Apparatus

Figure 2:
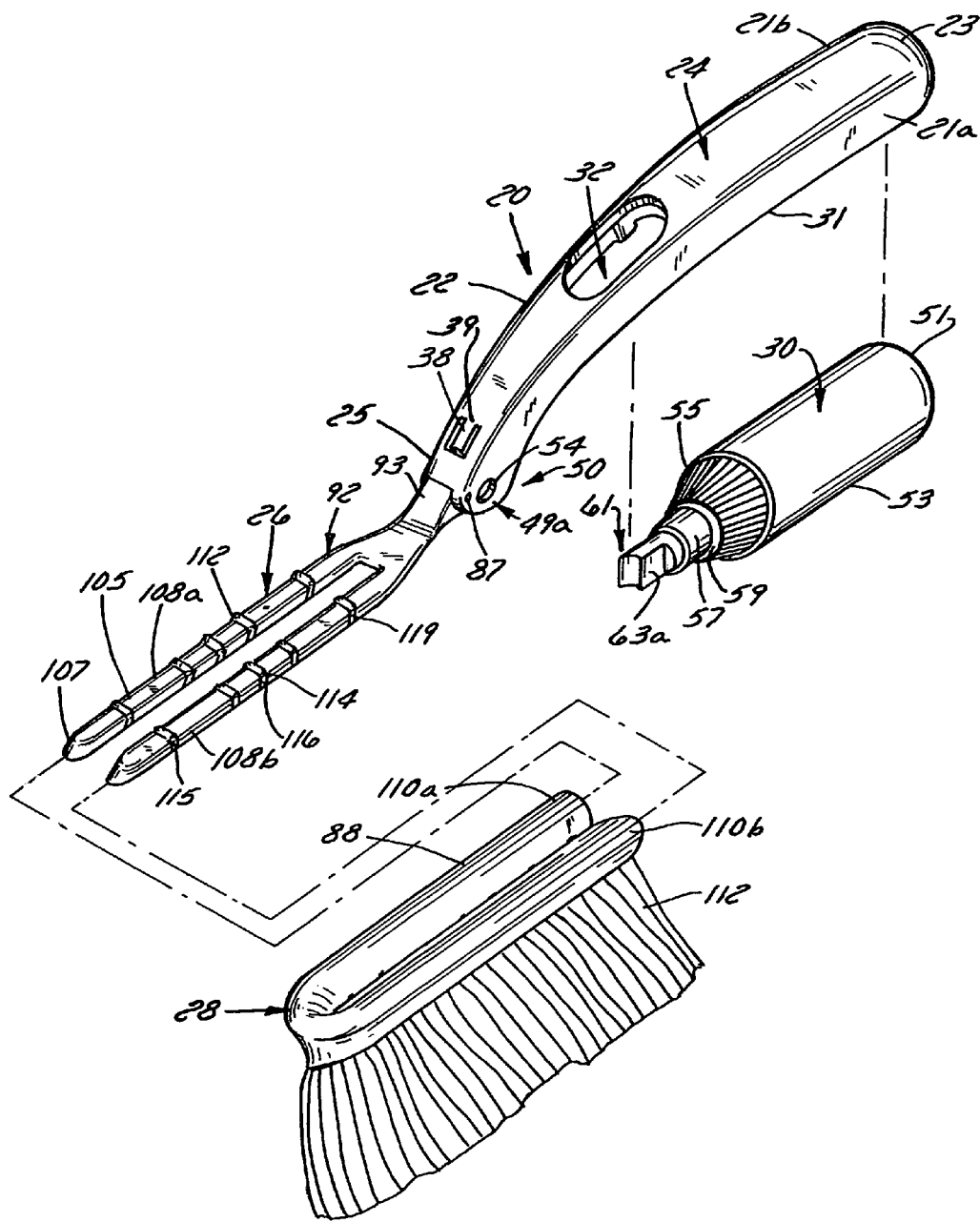
FIG. 2 is an exploded perspective view of the component parts of the cleaning system illustrated in FIG. 1.

Turning initially to FIGS. 1 and 2, the cleaning system 20 of the inventive method is illustrated according to a preferred embodiment of the present invention. Cleaning system 20 is generally comprised of a cleaning tool 22, including a handle portion or handle 24 and pivotally attached cleaning pad support member, cleaning implement support member or cleaning media support 26, a liquid delivery system, cleaning fluid dispenser or reservoir 30 and a cleaning pad, cloth or cleaning media 28 attached to the cleaning tool 22 via the cleaning pad support member 26.

Handle portion 24 is preferably a curved ergonomically designed member configured to comfortably fit within the palm of a hand of a user. Handle portion 24 includes an integral top 29, first sidewall 21a, second sidewall 21b, rear wall 23 and bottom 31. Handle portion 24 may be constructed from a variety of synthetic resins, plastics or other suitable materials. In the preferred embodiment, handle portion 24 is constructed from polypropylene. Although the handle portion 24 may be constructed in a wide variety of sizes depending on the intended use, in the preferred embodiment, handle portion 24 is approximately 8.5 inches long, 1.3 inches wide and 1.7 inches high. The preferred dimensions allows for ease of use, manipulation, packaging, shipping and storage of the cleaning system 20 as well as increasing the overall ergonomics of the design. Handle portion 24 may be constructed in a variety of colors for increased aesthetic appeal. It may additionally be constructed from a translucent material.

As will be described in greater detail below, handle portion 24 preferably defines a fluid reservoir-receiving cradle, recess or bay 36. In the preferred embodiment, the insertion of the fluid dispenser or reservoir 30 into the cradle 36 finishes the ergonomic design or form of the handle portion 24. Thus, the palm of a user's hand extends over the top 29 handle portion 24 and the user's fingers extend at least partially around the fluid reservoir 30 when using the device. Additionally, the preferred curved ergonomic design of the of the handle portion 24 is constructed in a manner such that the pivot point defined by the pivot member receiving cavity 50 is located below the horizontal plane defined by the fluid reservoir 30 within the cradle 36. Such an orientation is advantageous in maximizing fluid application as discussed in greater detail below.

Figure 4:
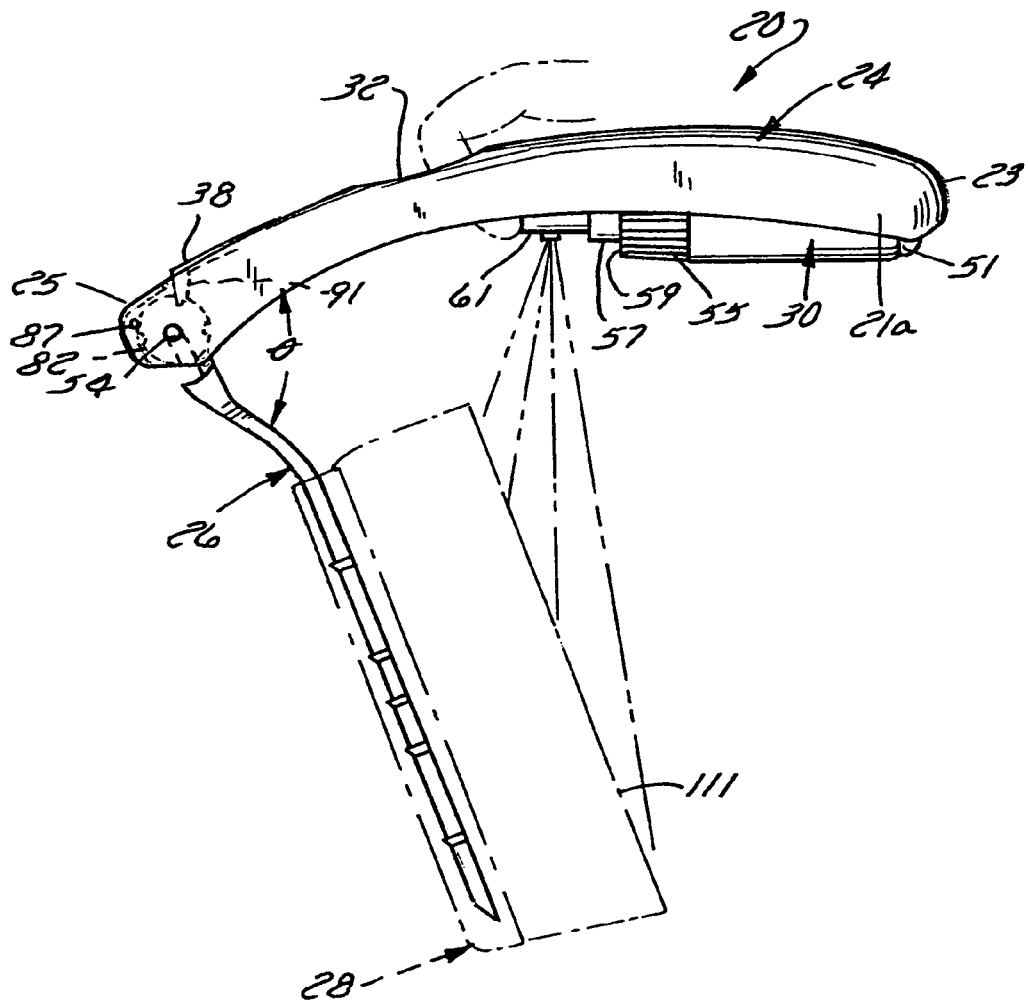
FIG. 4 is a side view of the cleaning system in a liquid application.

Near the center of the handle portion 24 is preferably an opening or hole 32 extending through handle portion 24 into the bottom 31 of the handle portion. In the illustrated embodiment, opening 32 is approximately 2.5 inches from a pivot member receiving cavity 50 located at the forward end 25 of the handle portion 24. As illustrated in FIG. 4, opening 32 provides a user single-handed access into a fluid reservoir-receiving cradle, recess or bay 36 defined in the bottom 31 of the handle portion 24. Near the forward end 25 of the handle portion 24, above the pivot member receiving cavity 50 is a cantilevered pivot engagement tab 38, extending downwardly into the pivot member receiving cavity 50 described in greater detail below.

FIG. 2 illustrates one preferred embodiment of a fluid reservoir 30 of the cleaning system 20. In the illustrated embodiment, fluid reservoir 30 is in the form of a fluid dispenser or a pump-activated spray bottle configured to retain water or a specialized fluid. The fluid may be comprised of a variety of known products. Preferably the fluid is selected from the commercially available Pledge® Multi-Surface Cleaner, Pledge® Wood and Glass Cleaner, End Dust®, Fantastic® all purpose cleaner, Windex® glass cleaner, antibacterials such as Oust® or Lysol®, fragrances such as Glade®, leather or vinyl treatment such as Armor All®, fabric protectors such as Scotch Guard®, or fabric fresheners such as those manufactured by S.C. Johnson & Son, Inc. of Racine, Wis., or Fabreze®. The fluid may alternatively generally comprise, without limitation: any all-purpose cleaner, oil or water based dust inhibitor, anti-static, anti-microbial, antibacterial, sanitizing and de-odorizing agent, dusting agent, glass cleaner, furniture polish, leather or vinyl treatment, other cleaning agent, wax, polish or shining agent, softening agent, friction-enhancing compound, perfumes, dish cleaner, soap, insect repellent or insect barrier, exfoliator or other personal care product, paint for sponge painting or other application, water out emulsions, oil out emulsions, dust mite killer or repellant, abrasive cleaner, shoe polish, pet sanitation products, etc.

As illustrated in FIG. 2, the preferred spray bottle is a generally cylindrical bottle having an integral bottom 51, sidewall 53, second 55 and third 59 sections. A spray cap or nozzle 61 is screwed or press fitted onto the top of the spray bottle. The spray cap 61 includes a pair of opposed flats 63a, 63b configured to selectively engage flanges 71a, 71b of the fluid reservoir-receiving cradle 36. Alternatively, a system of tabs and grooves could be used to form a similar locking mechanism. The spray cap 61 could alternatively include a one sided flat button or a tapered button. In addition to the illustrated spray bottle, the fluid reservoir 30 could take a variety of forms including but not limited to an aerosol package, a deformable handle or reservoir that dispenses fluid by squeezing, a squirt gun or a flexible pouch with an attachable spray nozzle. While the fluid reservoir 30 is illustrated as fitting within the cradle 36 of the handle portion 24, the fluid reservoir may alternatively completely form the handle of the system, having only the upper portion of the cleaning system attached (i.e. the pivot member and the attachment members).

It should be recognized that opposed flats 63a, 63b of the spray cap 61 provide for a tight fit within the handle portion 24, and further serve to properly orientate the fluid reservoir 30 within the cleaning system 20. Alternatively, it is understood that the fluid reservoir 30 could include other uniquely designed contours that allow for a mating tight fit within the fluid reservoir-receiving cradle 36.

Figure 5:
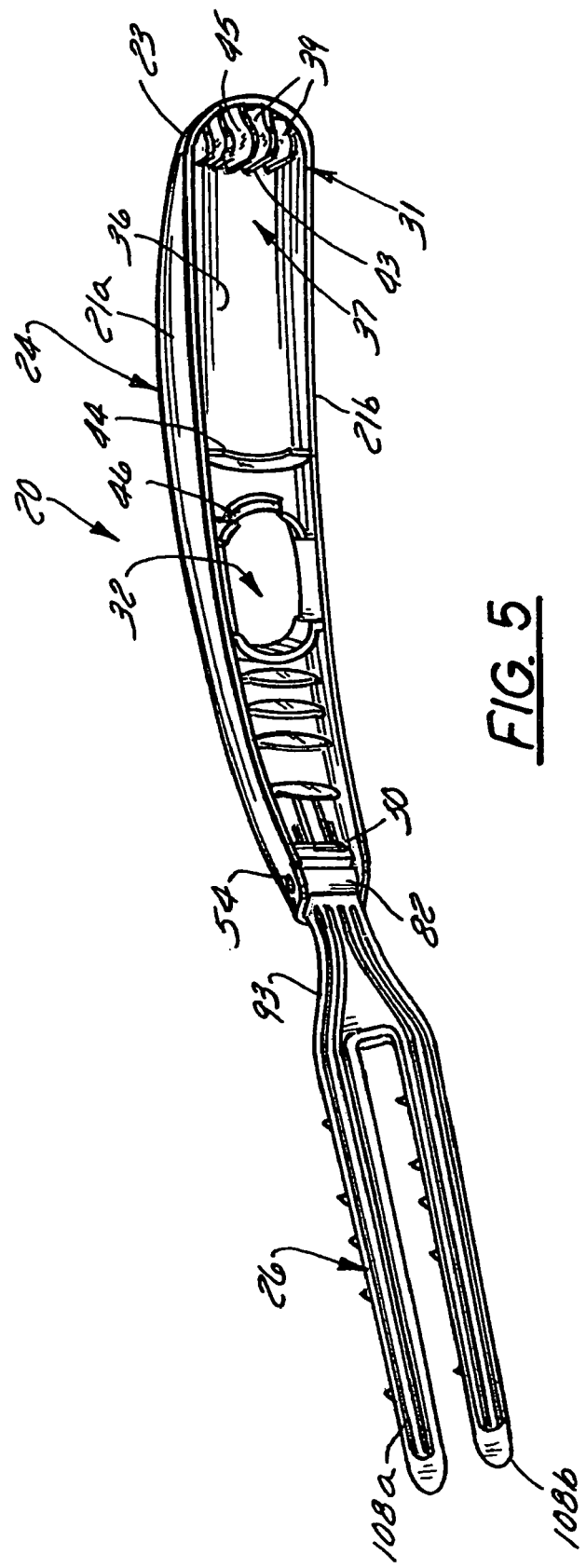
FIG. 5 is a perspective view of the underside of the cleaning system illustrating a preferred construction of the fluid-receiving cradle.

FIG. 5 better illustrates the bottom 31 of the handle portion 24 defining the fluid reservoir-receiving cradle 36. Cradle 36 is generally defined by a lower support 37, handle portion sidewalls 21a, 21b and two U-shaped supports or rails 44 and 46 configured to receive the fluid reservoir 30 of the preferred embodiment. In the preferred embodiment, lower support 37 is comprised of a plurality of ribs 39 extending from the inner side of rear wall 23 of handle portion 24. The forward ends 43 of ribs 39 define the lower support 37 configured to support the bottom 51 of the fluid reservoir 30. In the preferred embodiment, ribs 39 include a central rib 45 having a length roughly equal to diameter of the bottom of the fluid reservoir 30. The remaining ribs 39 define progressively shorter lengths, thereby tapering off from the central rib 45 and supporting the remainder of the circular bottom of the fluid reservoir 30. As best shown in FIG. 9, a pair of triangular retention tabs 42a, 42b extend along opposed sides of the cradle 36 near the lower support 37. Retention tabs 42a, 42b are configured to frictionally engage and retain the lower sidewall 53 of the fluid reservoir 30. Extending forwardly from the retention tabs 42a, 42b, sidewalls 21a, 21b further define the sides of the fluid reservoir-receiving cradle 36 and are spaced in a manner to tightly fit around the sidewall 53 of the fluid reservoir 30.

While in the illustrated preferred embodiment, the fluid reservoir 30 is press fit or friction fit within the cradle 36 of the handle portion 24, it is recognized that alternative configurations could be utilized to retain the fluid reservoir 30 within the handle portion 24. For example, Velcro® or rubber bands could be included on a segment of the handle portion 24 in order to retain the fluid reservoir 30 within the handle portion 24. Other support structures or retaining features could be hingedly or otherwise attached to the handle portion to retain the fluid reservoir within the handle portion.

Near the forward end of the fluid reservoir-receiving cradle 36 is a first U-shaped bottleneck receiving support 44. First bottleneck receiving support 44 is configured to press fit around, receive and retain the fluid reservoir 30 of the preferred embodiment. As illustrated in FIGS. 6 and 8, first bottleneck receiving support 44 is configured to press fit around the fluid reservoir 30 near the junction 59 of the second 55 and third 57 sections of the reservoir 30.

Slightly forward of the first bottleneck receiving support 44 is a second U-shaped spray cap receiving support 46. Spray cap receiving support 46 is configured to press fit around, retain and orientate the spray cap 61 of the fluid reservoir 30. As best illustrated in FIG. 7, spray cap receiving support 46 is defined by a pair of flanges 71a, 71b extending from the inner side of opposed sidewalls 21a, 21b. Flanges 71a, 71b are configured to press fit around flats 63a, 63b of fluid reservoir spray cap 61 when the reservoir is placed within the cradle 36. The tight fit defined by flanges 71a, 71b and flats 63a, 63b serves to properly orientate spray cap 61 within the fluid reservoir-receiving cradle 36 such that spray cap 61 faces in a direction away from the cradle 36. Forward of the opening 32, are a plurality of structural support ribs 48 extending forwardly towards the pivot member receiving cavity 50.

Figure 11:
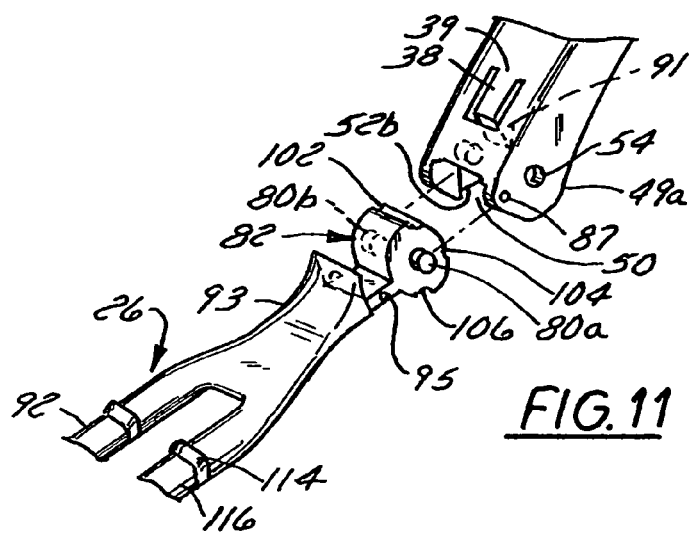
FIG. 11 is an exploded partial perspective view of the pivot assembly of the inventive cleaning system illustrated in FIGS. 1-5.

Turning now to FIGS. 6 and 11, at the forward end 25 of the bottom 31 of the handle portion 24 is a pivot member receiving cavity 50. Pivot member receiving cavity 50 is defined between integral opposed ears 49a, 49b located at the forward end 25 of the handle portion 24. Ears 49a, 49b include opposed grooves 52a, 52b on their inner cavity surface configured to slidably engage the axles 80a, 80b of a circular pivot member 82 during assembly. Grooves 52a, 52b have a width that is equal to or slightly wider than the diameter of the axles 80a, 80b of the circular pivot member 82. It is understood that grooves 52a, 52b and the pivot member receiving cavity 50 are configured to accommodate a variety of alternative cleaning pad support members 26 or other cleaning implements having pivot members 82 attached at their proximal ends.

At the terminal end of the grooves 52a, 52b, are pivot holes 54 configured to receive the axles 80a, 80b of the circular pivot member 82 and allow pivotable motion therein. A curved slot 83 extends laterally from grooves 52a, 52b and defines a passage configured to allow the movement of circular pivot retention tabs 85 extending from the pivot member 82. On opposed sides of the forward end of the pivot member receiving cavity 50 are circular pivot retention tab holes 87 configured to engage and receive the circular pivot retention tabs 85 located on the pivot member 82.

Projecting downwardly from the top 29 of the handle portion 24 into the pivot member receiving cavity 50 is a resiliently biased semi-flexible pivot engagement tab 38. Engagement tab 38 is comprised of a first end 39 attached to the handle portion 24 and a second free end 91 configured to engage notches 102, 104, 106 on the outer surface of the pivot member 82 as will be described in greater detail below.

Attached within the pivot member receiving cavity 50 of the handle portion 24 is the cleaning pad support member 26. Cleaning pad support member 26 is comprised of an integral circular pivot member 82, linking section 93 and support head generally designated 92. Circular pivot member 82 includes integral axles 80a, 80b on its opposed lateral sides. As best shown in FIG. 11, axles 80a, 80b are configured to fit within pivot holes 54 and rotatably pivot therein. Pivot member 82 also includes a circular pivot retention tab 95. Circular retention tab 95 is configured to fit within retention tab holes 87 and support the system is in the cleaning position. Pivot member 82 defines three notches or indentations 102, 104, 106 corresponding to alternative positions of the cleaning pad support member 26. A cleaning position notch 102, liquid application notch 104 and storage position notch 106 are defined on the external surface of the pivot member 82. In general, the preferred pivot assembly requires about between 2-3 lbf of pivot force in order to rotate it.

Integral with and extending from the pivot member 82 is the linking section 93 and support head 92. In the preferred embodiment, support head 92 of cleaning pad support member 26 includes a pair of parallel attachment members or attachment prongs 108a, 108b configured to engage the pockets or sleeves 110a, 110b of a cleaning pad 28 as is generally known in the art. Attachment members 108a, 108b may be spaced apart in a variety of configurations, however, in the preferred embodiment, attachment members 108a, 108b have a total width of about 1.25 inches from opposed outside lateral edges. The preferred attachment members 108a, 108b are about 6.75 inches long, about 0.75 inches thick, and about 0.80 inches wide. Attachment members 108a, 108b define a rounded leading edge 107 configured for ease of insertion into the sleeves 110a, 110b of cleaning pad 28. It is recognized that although the preferred embodiment illustrates a pair of attachment members 108a, 108b multiple configurations may be utilized. For example, a single, wider attachment member could be utilized. Alternatively, three or more attachment members could be utilized.

Attachment members 108a, 108b may include a plurality of spaced cleaning pad retaining tabs, barbs or projections 112 projecting from their upper surface 105. In the illustrated embodiment, retaining tabs 112 are triangular-shaped tabs having a first wall 114 extending in a generally vertical direction from the upper or lower surface of the attachment members 108a, 108b and a second angled wall 116 sloping from the upper edge of the first wall 114 towards the distal end of the attachment members 108a, 108b. Tabs 112 are preferably raised about 0.050 inches from the attachment members 108a, 108b. The unique triangular configuration of the retaining tabs 112 serves a dual function. The angled wall 116 allows for ease of placement of the cleaning pad 28 on the attachment members 108a, 108b during assembly, while the vertical first wall 114 retains the cleaning pad 28 on the attachment members 108a, 108b during the cleaning motion.

In addition to the unique configuration of the retaining tabs 112, their orientation on the attachment members 108a, 108b also serves to maintain the cleaning pad 28 on the attachment members 108a, 108b. In the illustrated embodiment, the retaining tabs 112 are staggered and include a leading tab 115, three intermediary tabs 117 and a trailing tab 119. In the illustrated embodiment, each attachment member 108a, 108b includes five retaining tabs 112. Testing has illustrated that when the retaining tabs 112 are spaced an equal distance from one another, their retention function is not as great as when the tabs are placed in the staggered configuration illustrated in the preferred embodiment. In the preferred embodiment, the first tab is spaced 1.0 inch, the second is spaced 2.0 inches, the third 2.5 inches, the fourth 3.0 inches and the fifth 4.0 inches from the rounded leading edge 107.

In one embodiment, the attachment members 108a, 108b may be expandable, inflatable, partially inflatable, or include an inflatable portion. The inflatability provides for an improved fit of the cleaning pad 28 on the attachment members 108a, 108b as well as facilitating hands free removal of the cleaning pad 28 from the attachment members 108a, 108b.

Cleaning pad 28 is generally known in the art and comprised of a combination of fibers defining a cleaning surface 111 and attachment portion 113. The cleaning pad 28 may, for example, include a plurality of fluffed nonwoven fabrics made of synthetic resins, which may be welded to one another. The pad may include fibers constructed from PP, PE, PET fibers in a variety of alternative percentages by weight. In the illustrated embodiment, attachment portion 113 defines a pair of pockets or sleeves 110a, 110b configured to receive the attachment members 108a, 108b of the cleaning pad support member 26. Cleaning pad 28 is preferably, a 20 g/sqm spun lace cloth with between 1-4% mineral oil manufactured by Haso Corporation of Japan. Such cleaning or dusting pads are described in PCT/JP2004/10507.

When the cleaning system 20 is used, the sleeve-like cleaning pad 28 is mounted over the attachment members 108a, 108b so that all of the retaining tabs 112 are within the sleeves 110a, 110b. The retaining tabs 112 are, in this configuration, thus capable of being fully enclosed by the cleaning pad 28, avoiding the possibility of the attachment members 108a, 108b scratching delicate furniture or other items being contacted.

The cleaning surface 111 of cleaning pad 28 may be comprised of a polymer that allows for the spontaneous transport of aqueous fluids. Such polymers are described in, for example, U.S. Pat. Nos. 5,723,159, 5,972,505 and 5,200,248 the disclosures of which are expressly incorporated by reference.

It should be recognized that the polymer fibers of the cleaning pad can take a variety of forms to increase various performance characteristics of the cleaning system 20. Standard circular fibers may be used, as is generally known in the art. Alternatively, the individual fibers on the cleaning pad may be lobed in the form of loose tow fibers. The unique lobed configuration creates channels within the individual fibers enabling improved capillary action on each individual fiber and increasing the overall cleaning or dusting surface area thereby increasing the overall efficiency, e.g., of both wet and dry dusting. The higher surface area results in an increase in the proportion of particles adhering in the grooves or channels and results in dust particles being "trapped" within the grooves of the lobed fiber. The lobed fibers generally exhibit improved dust retention, more efficient wet wiping and longer life than standard circular fibers. Furthermore, the lobed fibers can be made stiffer thereby generating a higher wiping pressure in a smaller contact area. It is understood that the inventive lobed fibers could be comprised of a multitude of polymers with PP, PE or PET being recognized as the most cost effective alternatives. Alternatively acrylic or biodegradable polymers could be utilized.

In another alternative embodiment, the cleaning pad 28 may include stiffer or strut fibers attached to mass of tow fibers. In this arrangement, the stiffer fibers (usually in the range of about 0.3 mm) carry the majority of the stress applied to the cleaning pad 28. The tow may be linked to the stronger fibers by entanglement at the outer ends of the fiber. The stiffer fibers result in a cleaning pad 28 that is springy resulting in a more desirable feel of applied force for users. The stiffer fibers can further be utilized to clean difficult areas such as crevices, blinds or screens. The stiffer fibers have the further advantage in that they keep the tow volume expanded, thereby increasing dust migration into the tow fibers.

In yet another alternative embodiment, the cleaning pad 28 could include absorbent materials in particulate form fixed onto the remaining fibers of the cleaning pad 28. The absorbent materials may take the form of known super absorbent polymers SAP. The SAPs may be, for example, acrylic based polymers applied as a coating or turned into fibers directly. Such commercially available SAPs generally include X-linked polyacrylic acids or X-linked starch-acrylic-acid-graft-polymers, the carboxyl groups of which are partially neutralized with sodium hydroxide or caustic potash. The SAPs may be made by such processes as a solvent or solution polymerization method or the inverse suspension or emulsion polymerization method. Such SAPs are disclosed in, for example, U.S. Pat. No. 6,124,391.

The absorbent materials increase the overall absorbency of the fibers, prevent the fibers from packing close together into a fiber mass, and enhance the friction of the fibers. The "string of pearls" arrangement also allows for strategically placed high absorbency regions on the cleaning pad. For example, if it is desirable to have the forward end of the cleaning pad 28 be more absorbent than the remainder of the cleaning pad 28, the forward end could include a higher percentage of the particulate absorbent materials.

The cleaning pad 28 could also include fibers that are formed into helices. Such fibers can be formed by drawing fiber bundles over a blade or heating coaxial bicomponent fibers. The resulting helical fibers exhibit a fluffier texture and more attractive appearance while at the same time increasing the volume (while using less fiber) and dust retention of the duster. The helical nature of the fibers is also advantageous in that they allow coarse fibers to feel softer due to the spring effect. Furthermore, the fibers gradual loss of the helical nature, can serve as an indication of the effective life of the cleaning pad.

It should be recognized that none of the aforementioned fiber materials or configurations are exclusive. The cleaning pad could include strategic combinations of the various fibers and other known fibers. In one example, the cleaning pad may be comprised of between 25-100% of the lobed fibers by weight.

Similarly, although the preferred embodiment discloses a single cleaning surface 111, the invention is in no way limited to such a single cleaning surface. To the contrary, numerous alternative configurations are within the scope of the present invention. For example, the inventive pad could include multiple cleaning surfaces, with alternate or similar fiber configurations to accommodate various cleaning functions. In one embodiment, a cleaning pad 28 could be two sided with one side of the cloth for dusting and the alternate side of the cleaning pad 28 for cleaning. This could also be accomplished by turning the pad "inside out" to expose a new clean surface. Alternatively, a triangular or other multi-sided cleaning pad 28 could be utilized. Circular cleaning pads are also envisioned and within the scope of the present invention. In general, a variety of cleaning pad 28 shapes or configuration could be utilized to maximize the various properties of the cleaning pad 28 and selected fibers.

As noted above, the orientation and type of fibers utilized on the cleaning pad 28 could include a wide variety of alternatives. For example and in no way limiting, the cleaning pad 28 could include a generally fluffy pad including a flat center strip around the area defined by the pockets or sleeves 110a, 110b. Such an orientation may increase the surface area and exhibit a better efficacy. Additionally, the center strip could include an absorbent pillow or tube extending down the center of the cleaning pad 28. Such an absorbent pillow could provide an area of high absorbency on the cleaning pad 28. Various alternative combinations are envisioned including, for example, cleaning pads consisting of alternating sections of sponges, feather-like structures, micro-fibers or cellulose foam. Wood pulp is preferred.

The cleaning pad 28 could also include a fluffy cloth with a hydrophilic additive to improve the absorbency of water. Such hydrophilic additives include but are not limited to glycerin and glycols. The cleaning pad 28 could also be comprised entirely of an absorbent material such as Rayon.

The cleaning pad 28 or cleaning pad support member 26 could also include a piezoelectric crystal to impart an electrostatic charge on the cleaning pad during use to increase dust retention. Such crystals are generally known and typically generate a charge when subjected to mechanical stress. Examples of materials that can be used include but are not limited to quartz analogue crystals like berlinite ($AlPO_4$) and gallium orthophosphate ($GaPO_4$), ceramics with perovskite or tungsten-bronze structures ($BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$). Additionally some Polymer materials like rubber, wool, hair, wood fiber, and silk exhibit piezoelectricity to some extent and may be also utilized. Additionally, the polymer polyvinylidene fluoride, ($-CH_2-CF_2-$), which exhibits piezoelectricity several times larger than quartz may be used.

The cleaning pad 28 may also include a portion of an unbonded web material, as described in U.S. Pat. No. 5,858,112, issued Jan. 12, 1999 to Stokes et al. and U.S. Pat. No. 5,962,112, issued Oct. 5, 1999 to Haynes et al. or other material such as described by U.S. Pat. No. 4,720,415, issued Jan. 19, 1988 to Vander Wielan et al. or any super absorbent material such as described in U.S. Pat. No. 4,995,133, issued Feb. 1991 and U.S. Pat. No. 5,638,569 both issued to Newell, U.S. Pat. No. 5,960,508, issued Oct. 5, 1999 to Holt et al., and U.S. Pat. No. 6,003,191, issued Dec. 21, 1999 to Sherry et al.

In one embodiment, the cleaning pad 28 may comprise a spunbond fiber nonwoven web having a basis weight of approximately 68 grams per square meter. The spunbond fibers may comprise bicomponent fibers having a side-by-side configuration where each component comprises about 50%, by volume, of the fiber. The spunbond fibers will comprise first and second polypropylene components and/or a first component comprising polypropylene and a second component comprising propylene-ethylene copolymer. About 1% or more or less of titanium oxide or dioxide is added to the fiber(s) in order to improve fiber opacity. The spunbond fiber nonwoven web thermally bonded with a point unbonded pattern. The nonwoven web is bonded using both heat and compacting pressure by feeding the nonwoven web through a nip formed by a pair of counter-rotating bonding rolls; the bonding rolls comprise one flat roll and one engraved roll. The bonded region of the nonwoven web comprises a continuous pattern that corresponds to the pattern imparted to the engraved roll. Further, the bonded region is applied to the web when it passes through the nip. The bonded region will range between approximately about 27% to about 35% of the area of the nonwoven web and forms a repeating, non-random pattern of circular unbonded regions. Absorbency enhancing or superabsorbent materials, including superabsorbent polymers, powders, fibers and the like may be combined with the cleaning pad 28.

Alternatively, the pad 28 comprises a laminate of an air-laid composite and a spunbond fiber nonwoven web. The nonwoven web may comprise monocomponent spunbond fibers of polypropylene having a basis weight of approximately 14 grams per square meter. The air-laid composite may comprises from about 85% to about 90% kraft pulp fluff and from about 10% to about 15% bicomponent staple fibers. The bicomponent staple fibers may have a sheath-core configuration; the core component comprising polyethylene terephthalate and the sheath component comprising polyethylene. The air-laid composite has a basis weight between about 200 and about 350 grams per square meter and an absorbency of between about 8 and about 11 grams per gram.

The cleaning pad 28 may also include a portion or side of hydrophilic fibers useful for scrubbing. Additionally, nylon fibers may be used to increase the coefficient of friction when they become wet. Portions of the cleaning pad 28 may be composed of microfibers and ultra-microfibers having a denier per filament (dpf) less than or equal to about 1.0.

As described, the cleaning pad 28 can be formed by any material or material-forming process known, including woven and non-woven materials, polymers, gels, extruded materials, laminates, layered materials which are bonded together integrally and thus form a co-material, fused materials, extruded materials, air laying, etc.

The cleaning pad 28 may alternatively be optimized for providing a cleaning fluid to the surface, such as with micro capsules or encapsulated fluids or agents. The enhanced surface of the cleaning pad 28 can have scrubbing or abrasive qualities. The enhanced surface can also be formed by a mechanical stamping, bonding, pressing, compression, extrusion, sprayed, sputtered, laminated or other surface forming or affecting process. The various alternative cleaning solutions discussed above could be microencapsulated into the cleaning pad such that they are selectively released by some additional stimulus. It is understood that various cleaning solutions microencapsulated into the cleaning pad could be activated by water, another chemical in the fluid reservoir or pressure. The solutions could be dry impregnated. Alternatively, the chemical solutions could be encapsulated in pockets or bubbles on or within the pad 28 or on the cleaning media support 26. The pockets could be designed to burst and release the cleaning solution upon the application of moderate pressure.

It should be understood that the cleaning system 20 may be presented with its component parts partially preassembled or unassembled. During assembly or manufacture of the cleaning system 20, the ears 49a, 49b of the preformed handle portion 24 described above can be forced to flex outward from each other as the pivot member 82 is inserted therebetween in the orientation described above. The axles 80a, 80b slide along the path defined by the grooves 52a, 52b until they reach the pivot hole 54 defined at the terminal end. Axles 80a, 80b fit within holes 54 thereby defining a pivot joint. The sleeves 110a, 110b of the cleaning pad 28 are then placed over the attachment members 108a, 108b securing the cleaning pad to the system.

The circular pivot member 82 accommodates rotational movement of the cleaning pad support member 26 in a range of about 55 to 65 degrees relative to the longitudinal axis of the handle portion 24. The preferred range is ideal for accommodating the alternate fiber lengths and cloth geometries of the inventive system. Particularly preferred is a range of about 61 degrees. When the cleaning pad support member 26 is fully extended in its cleaning position (FIG. 1), circular retention tabs 95 fit within retention tab holes 87 and maintain the cleaning pad support member 26 in its cleaning position.

FIGS. 1, 3, 4, and 10 illustrate the inventive cleaning system in its alternating positions. FIG. 1 illustrates the cleaning system 20 in its cleaning position. As described above, in the cleaning position the cleaning pad support member 26 extends forwardly, pivot engagement tab 38 engages the cleaning position notch 102 of pivot member 82, and retention tabs 95 fit within the retention tab holes 87. These engagement or retaining features create at least 2.5 lbf of pivot force. This amount of force is sufficient to maintain the cleaning pad support member 26 in its fully extending cleaning position despite any torque experienced during normal dusting, drying, or cleaning motions. Thus, in the cleaning position, a user may manipulate the cleaning system 20 via the handle portion 24. Additionally, the user may apply the water or other liquid housed within the fluid reservoir 30 directly onto the surface to be cleaned. The user may insert a finger through the opening 32 and depress the spray cap 61 thereby causing the discharge of the material housed within the reservoir 30. Due to the orientation of the cleaning system 20 in the cleaning position, the liquid or other material (e.g. foam or powder) will typically be applied directly to the surface to be cleaned in an area behind the cleaning pad 28 when the system is in a horizontal orientation such as when dusting a coffee table. Alternatively, a cleaning solution can be sprayed onto a vertical surface to be cleaned, such as a window or door molding.

Figure 10:
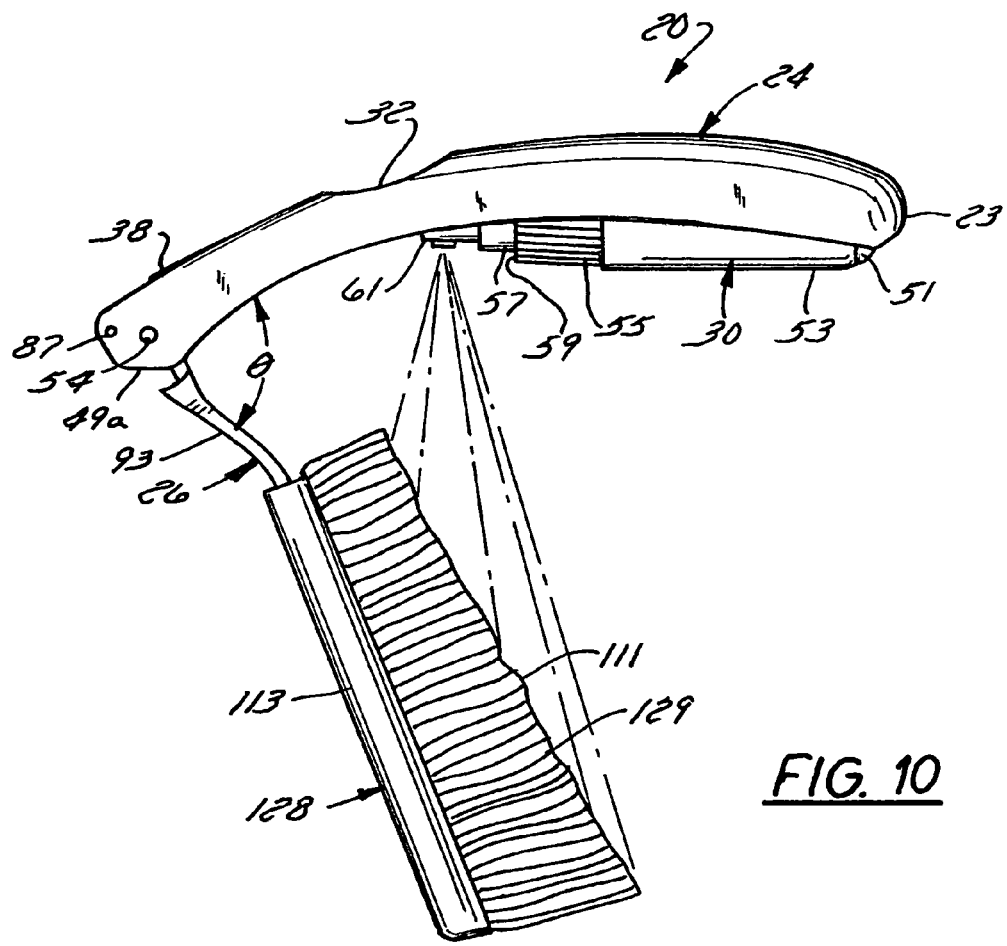
FIG. 10 is side view of a cleaning system in the liquid application position further illustrating an alternative embodiment of the cleaning pad attached to the cleaning system.

FIGS. 4 and 10 illustrate the cleaning system 20 in a second liquid application position. In order to move the cleaning pad support member 26 into the liquid application position, a user must hold the handle portion 24 and apply torque to the cleaning pad support member 26 to move it from the cleaning position illustrated in FIG. 1. As sufficient torque is applied to overcome the forces of the inventive engagement features, the circular pivot member 82 rotates downwardly into the liquid application position. In the liquid application position, pivot engagement tab 38 engages the liquid application notch 104 of the pivot member 82 thereby holding the cleaning pad support member 26 is its angled liquid application state. In the illustrated embodiment, the angle Ø between the cleaning pad support member 26 and the handle portion 24 in the liquid application position may be between 45° and 68°. Preferably, the angle Ø between the cleaning pad support member 26 and the handle portion 24 is between 55° and 68° with 63° being particularly preferred. This preferred angle takes into consideration the spray pattern of the fluid reservoir (shown in phantom) in order to achieve liquid application onto the greatest surface area of the cleaning surface 111 of the cleaning pad 28.

During dusting or cleaning a user may repeatedly rotate the cleaning pad support member 26 from its cleaning position to its liquid application position as needed. Alternatively, as noted above, a user may simply apply liquid directly to the surface to be cleaned while using the cleaning system 20 in the cleaning position.

Figure 3:
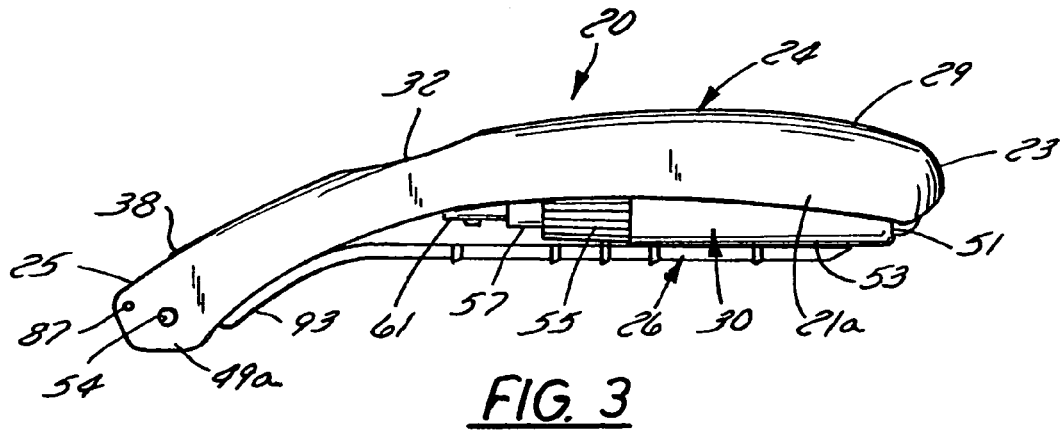
FIG. 3 is a side view of the cleaning system.

FIG. 3 illustrates the storage position of the cleaning system. As illustrated in FIG. 3, in the storage position the cleaning pad support member 26 is rotated backwards such that it is generally parallel to the plane defined by the longitudinal axis of the handle portion 24. In the storage position, engagement tab 38 engages the storage position notch 106 thereby maintaining cleaning pad support member 26 in its folded position. In the storage position, the cleaning system 20 may be easily stored into a variety of spaces such as kitchen drawers or cabinets. Alternatively, the system can be hung on a wall using the opening 32 in the handle portion 24.

As it can be appreciated from the description above the invention includes a novel method of adjusting the cleaning pad support member 26. One first obtains the cleaning system 20. While holding the handle portion (and preferably no other portion of the device), one presses the cleaning pad support member 26 against an object (e.g. a wall or a floor) to cause rotation of the cleaning support member 26 relative to the handle portion 24. In an alternative embodiment, the pivot member may include a torsion spring or other biasing means to return the cleaning support member 26 to its cleaning position without effort on behalf of the user.

FIG. 10 illustrates an alternative embodiment of the cleaning pad 128 of the present invention. Cleaning pad 128 is similar to the pad previously described, however, pad 128 includes tapered fibers 129 on its cleaning surface 111. As illustrated in FIG. 10, fibers 129 are tapered in a manner such that those fibers 129 closest to the handle portion 24 are shortest. As one moves away from the handle portion 24, the fibers 129 become progressively longer in length. The tapered fiber length further accommodates the cleaning system 20 in achieving a maximum cleaning fluid application surface area on the cleaning surface 111, in the fluid application position.

Figure 12:
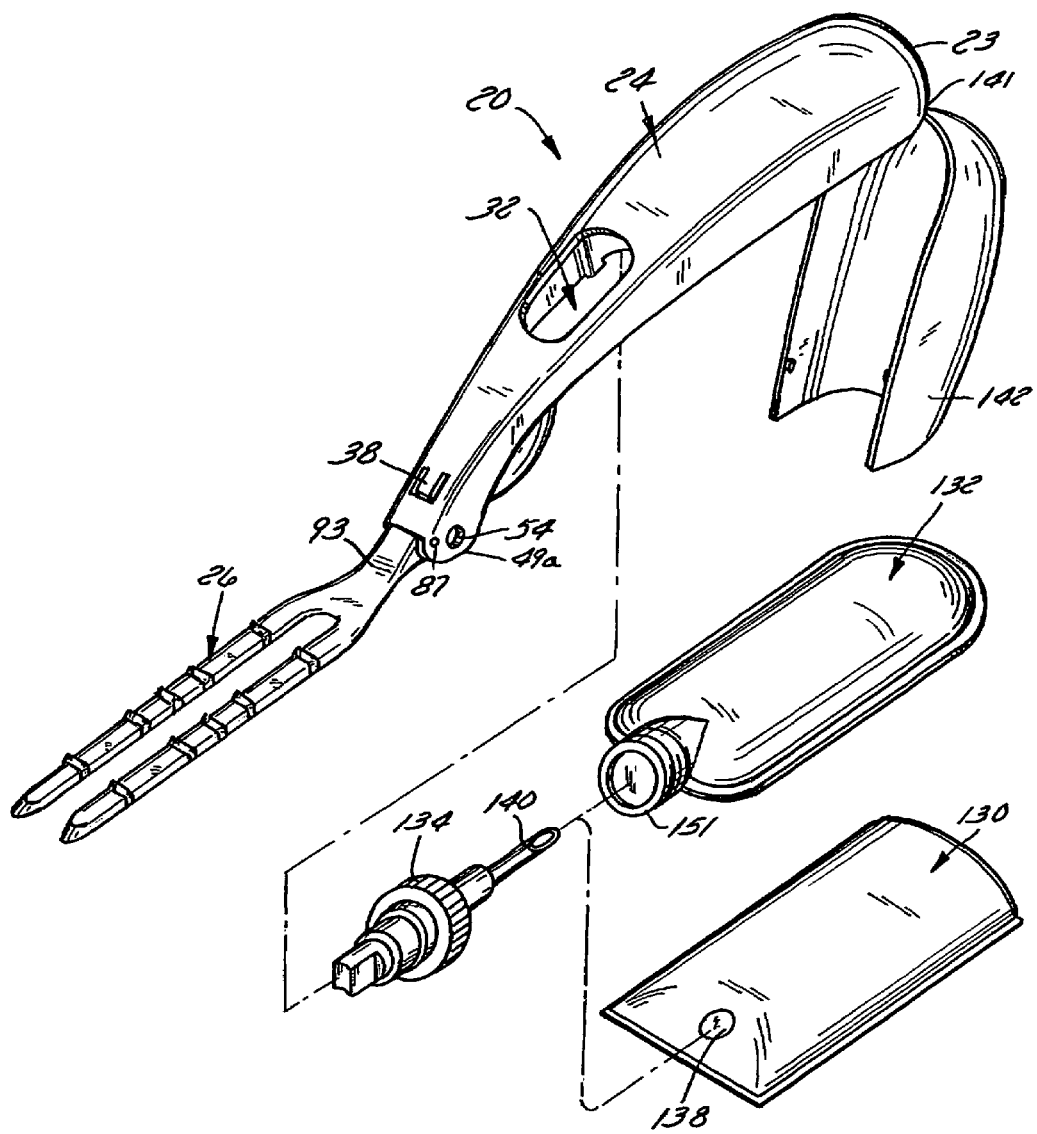
FIG. 12 is an exploded perspective view of the component parts of an alternative embodiment of the cleaning system.
Figure 13:
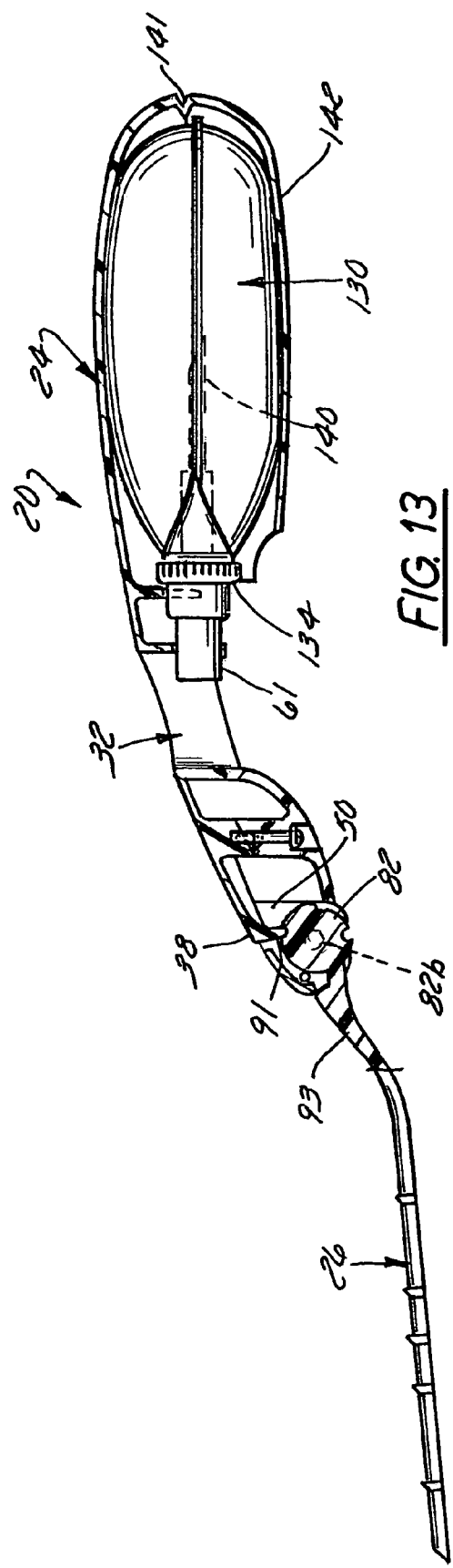
FIG. 13 is a vertical cross-sectional view of the alternative cleaning system illustrated in FIG. 12 taken along the longitudinal axis of the system.

FIGS. 12 and 13 illustrate an additional alternative embodiment of the cleaning system. As illustrated by FIGS. 12 and 13, the cleaning fluid reservoir 30 of the previous embodiment has been replaced with a flexible pouch 130. In the alternative embodiment, spray nozzle or cap 134, with an angled dip tube 140 may be retained in the handle portion 24 as previously described. A user may puncture the seal at a preformed location 138 on the pouch with the pump dip tube 140. Alternatively, a user may screw the spray cap 134 onto a threaded pouch fitment 151 or the spray cap 134 may be directly staked to the pouch 130 during the filling operation. As illustrated in FIGS. 12 and 13, the cradle of the previous embodiment has been replaced with a snap-fitting cover 142 attached via a living hinge 141 to the handle portion 24. Cover 142 secures the pouch 130 within the cleaning system 20.

b. Preferred Embodiments of the Cleaning Pad For Use With a Cleaning Solution

FIGS. 14-32 illustrate preferred embodiments of the cleaning pad 28 that may be used with the inventive cleaning system 22. In the illustrated preferred embodiments, the cleaning pad 28 is generally comprised of a cleaning fiber mat 203 layered on one surface of a base sheet 202. The fiber mat 203 is preferably bonded to the base sheet 202 in the lengthwise direction of the fiber mat 203 along a central bonding line 204 extending continuously along the center of the base sheet 202. In addition, the fiber mat 203 is bonded to the base sheet 202 at spot bonding regions 207 defining discontinuous lines that run parallel with the central bonding line 204. Although the spot bonding regions 207 are illustrated in lines, they could be randomly orientated along the base sheet. In addition, as described below, the fiber mat could be bonded to the base sheet only by the spot bonding regions 207 and without the use of the central bonding line 204. As described in greater detail below, although the size of the fibers defining the fiber mat 203 of the cleaning pad 28 may vary depending on the application, it is preferable that the size of the fibers be between 1-18 denier.

Figure 14:
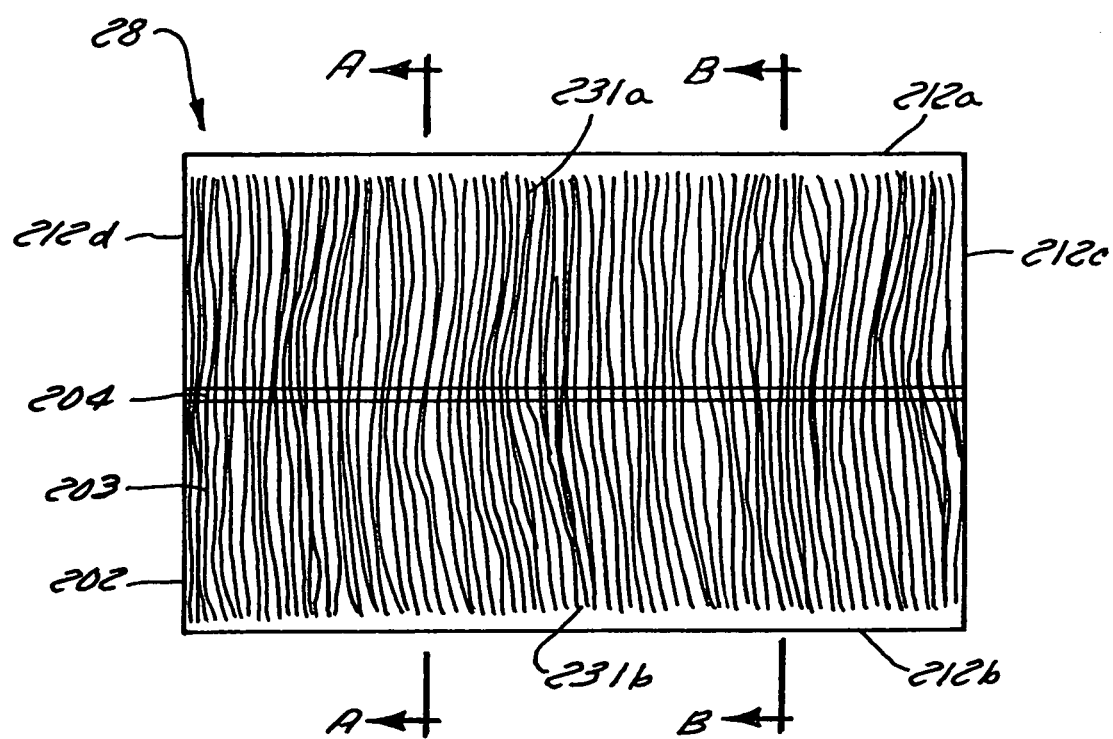
FIG. 14 is a bottom plan view of one preferred embodiment of the cleaning pad of the cleaning system.
Figure 15:
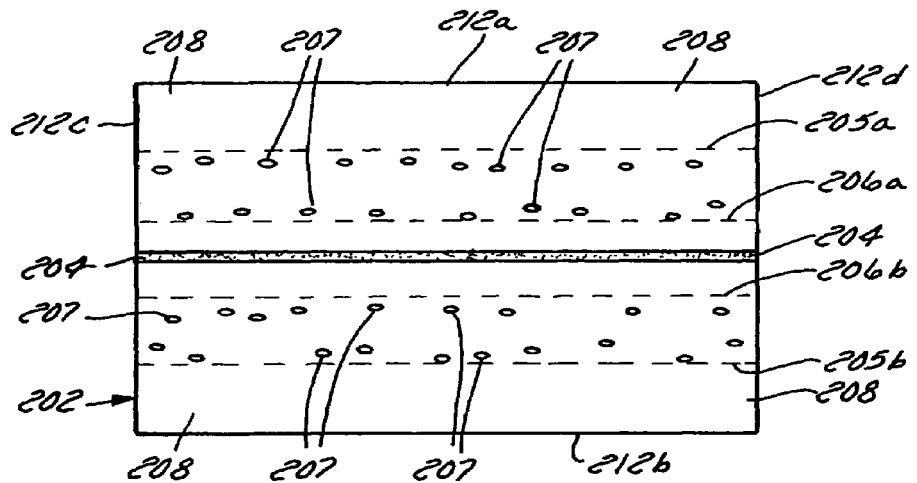
FIG. 15 is a plan view of the base sheet of the cleaning pad illustrating the preferred bonding regions.
Figure 16:
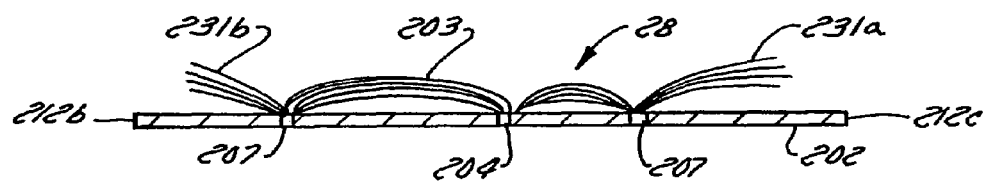
FIG. 16 is a cross-sectional view of the cleaning pad of FIG. 14 taken along line A-A.

Turning initially to FIGS. 14-16, a first preferred embodiment of the cleaning pad 28 of the present invention is illustrated. The cleaning pad 28 is formed by layering a fiber mat 203 on one surface of a base sheet 202. The base sheet 202 is preferably constructed from a nonwoven sheet or other equivalent as is known in the art. The base sheet 202 and fibers 203 are preferably bonded together along a central bonding line 204. In the illustrated embodiment, the central bonding line 204 extends from a first base sheet edge 212*c* to an opposed second base sheet edge 212*d*.

As illustrated in FIG. 15, in addition to the central bonding region 204, the fiber mat 203 and the base sheet 202 are bonded at a plurality of spot bonding regions 207. In one embodiment, the spot bonding regions 207 generally define discontinuous parallel broken lines 205a, 205b, 206a and 206b. In the illustrated embodiment, the broken lines 205a, 205b, 206a and 206b are parallel to the central bonding line 204. As discussed below, spot bonding regions 207 could also be randomly orientated on the base sheet 202.

Figure 17:
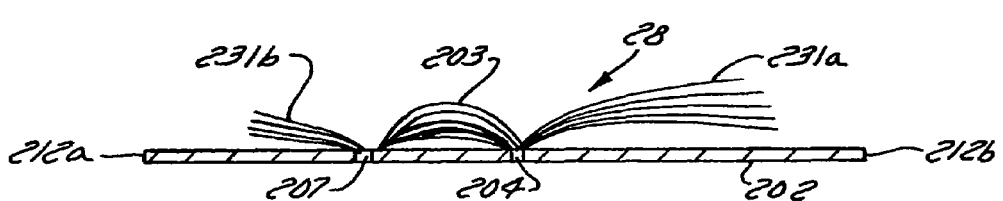
FIG. 17 is a cross-sectional view of the cleaning pad of FIG. 14 taken along line B-B.

The cross sectional views illustrated in FIGS. 16 and 17, better illustrate the bonding regions of fiber mat 203. The fibers of the fiber mat 203 generally extend freely between the central bonding line 204 and the edges 212a, 212b of the base sheet 202. However, portions of the fiber mat 203 are intermittently bonded to the base sheet 202 at the above described spot bonding regions 207 (FIG. 16). Alternatively, FIG. 17 illustrates a section of the fiber mat 203 that is not bonded at a spot bonding region 207 and extends freely from the central bonding line 204 to the end of the fiber 231a. Regardless of the orientation of the spot bonding regions 207, in the illustrated embodiments, the ends 231a and 231b of the fiber mat 203 are not bonded to the base sheet 202 and freely extend. The cleaning pad 28 is thus designed so fibers of the fiber mat 203 are free to move along lengths ranging from either the central bonding line 204 or the spot bonding regions 207 to the ends 331a and 331b. Due to this unique bonding pattern between the fiber mat 203 and base sheet 202 (characterized by discontinuous spot-bonded regions 207 between the central bonding region 204) entanglements of the individual fibers is lessened and the cloth exhibits an overall fluffier appearance. Furthermore, the configuration results in more open fiber in the fiber mat 203.

As best illustrated in the embodiment shown in FIG. 15, the spot bonding regions 207 generally define lines 205a, 205b, 206a and 206b that are parallel to the central bonding line 204. The individual spot bonded regions 207 are formed intermittently in a non-continuous linear fashion. The respective individual spot bonded regions 207 may be formed in a variety of shapes including circles, ellipses, ovals, straight lines, or the like. The spot bonded regions 207 may be formed such that the shapes of the spot bonded regions 207 are uniform, or, alternatively, the above shapes may be formed by a variety of combinations of the above shapes.

The width of the individual spot bonded regions 207 (along the lengths of the fibers) is preferably between 0.5-5 mm, and the length (in the lengthwise direction of the center bonding region) is preferably 2-15 mm. Each of the spot-bonded regions 207 is preferably spaced between 5-50 mm apart. It is understood that the spacing between the individual spot bonding regions 207 may be uniform throughout the entire range of the spot bonding regions 207, or the spacing may vary in a variety of patterns.

In addition to the described orientation of the spot bonding regions 207, the spot bonding regions 207 may be situated such that each of the spots alternates slightly to the left and right in the width-wise direction of the base sheet 202 (lengthwise direction of the fibers) with the parallel line as the center, so that the spot bonded regions 207 are positioned in zigzag patterns to the left and right with the parallel lines defining central lines. Thus, the spot bonding regions 207 need not necessarily be lined up linearly above the parallel lines 205a, 205b, 206a, 206b.

It should be understood, that the spot bonding regions 207 can be produced in other configurations, and are not limited to the above noted configuration. For example, the spot bonded regions 207 may define one parallel line between the central bonding line 204 and the edge 212a and one parallel line between the central bonding line 204 and the opposed edge 212b, so that they define only two parallel lines (e.g., 205a and 205b).

Alternatively, the spot bonded regions 207, could also define three parallel lines between the central bonding line 204 and edges 212a, 212b, such that they form a total of six parallel lines over the entire cleaning pad 28. Any number of lines could be formed, depending on the application.

The various spot bonding regions 207 do not overlap in the lengthwise direction of the fibers of the fiber mat 203, and thus bonding at multiple sites along the length of a single fiber does not occur. As a result, the majority of the length of the fiber on the fiber mat 203 is free. Because the fiber mat 203 is strategically unimpeded, this effectively prevents entanglement of the fibers of the fiber mat 203, while also allowing increased foreign matter trapping and retaining capacity to be maintained over a longer period of time.

Although the fibers of the fiber mat 203 can take a variety of lengths, in the preferred embodiment, the lengths of the fibers from the central bonding region 204 to the ends of the fibers in the lengthwise direction of the fibers is preferably 50-100% of the length from the central bonding region 204 to the edges (212a or 212b) of the base sheet 202. In one preferred embodiment, a cleaning pad includes a base sheet 202 with a width of 300 mm and a length of 200 mm. Preferably, the length from the central bonding region 204 to the edge of the base sheet 202 is 100 mm, and the length of the fibers of the fiber mat 203 is preferably between 50-100 mm.

As illustrated in FIGS. 16 and 17, the fiber ends 231a and 231b in the lengthwise direction of the fibers of the fiber mat 203 are not bonded to the base sheet 202, and the length of the fiber that is allowed free movement from the ends 231a or 231b of the fibers of the fiber mat 203 to the bonded regions varies from about 10-40 mm from the spot bonded regions to about 50-100 mm from those fibers that are only bonded along the central bonding line. Preferably, the lines defined by the spot-bonded regions 207 are in the range of 10-40 mm from the edges (202a or 202b) of the base sheet 202.

As noted above, the material of the base sheet 202 may be a non-woven cloth sheet, paper, synthetic resin sheet, or other known material. In the illustrated embodiment, the base sheet 202 is preferably a non-woven cloth sheet capable of trapping various types of foreign matter. Preferably, the nonwoven cloth used for the base sheet 202, weighs between 10 to 200 g/m$^2$ and has a thickness of between 0.01-0.1 mm.

In the preferred embodiment, when a thermal-welded fiber is used for the fiber mat 203, it is preferable for the base sheet 202 to have thermal welding capacity conducive to bonding with the fiber mat 203. Likewise, when a nonwoven cloth sheet is used it is preferable that it be thermally weldable to the fiber mat 203. As noted above, examples of such thermally weldable short fibers include polypropylene, polyethylene, polyethylene terephthalate and other fibers or materials in which the fibers are present in a core-sheath structure or in a side-by-side structure, thus forming composite fibers.

The nonwoven cloth sheet that is used as the base sheet 202, may be a spunless nonwoven cloth, spunbonded nonwoven cloth, thermally bonded nonwoven cloth, air-through bonded nonwoven cloth, spot-bonded nonwoven cloth, or others. In the preferred embodiment, a spunless nonwoven cloth or thermally bonded nonwoven cloth is utilized. The nonwoven cloth sheet may be formed from a single sheet, or may be formed by the lamination of multiple sheets of the same or different types.

The fiber mat 203 used in the cleaning pad 28 may be produced by overlaying multiple fibers so that they run in the same direction, or may be formed from a fiber aggregate. The fiber mat 203 is preferably in a sheet-form. In addition, the fiber mat 203 can be partially bonded by means of welding or the likes between the various fibers. The fiber mat 203 may include uniform fibers throughout, or may be constituted from multiple types of fiber.

The fiber mat 203 may also be manufactured from fibers having the same, or multiple thicknesses. Likewise, the fiber mat 203 can be formed from an aggregate in which fibers of different color are used, regardless of whether the thicknesses and types of the constituent fibers are the same or different.

As noted above, a wide variety of fibers may be used in the fiber mat 203 including cotton, wool and other natural fibers, polyethylene, polypropylene, polyethylene terephthalate, nylon, polyacrylic and other synthetic fibers, core/sheath fibers, sea-island type fibers, side-by-side fibers and other composite fibers. Synthetic fibers and composite fibers are preferred due to their thermal welding properties. In one preferred embodiment, the tow is a bi-component fiber consisting of a polypropylene core and a polyethylene outer surface or sheath. This is particularly preferred, because both materials have superior thermal welding properties. In addition, the fibers used for the fiber mat 203 may be formed from a crimped material produced by mechanical crimping or thermal crimping.

In one preferred embodiment, the fiber mat 203 may be a long fiber mat generally referred to as "tow," which is manufactured from polyethylene, polypropylene, nylon, polyester, rayon, or similar materials. The thickness of the fibers that constitutes the fiber mat 203 is preferably between 1-18 denier. In addition, the weight of the fiber mat 203 is preferably between 5-30 g/m² when the thickness of the fibers is about 2 denier.

The cleaning pad 28 of the present invention can be obtained by layering the fiber mat 203 on the surface of the base sheet 202, and then bonding the two along the central bonding line 204 and spot-bonded regions 207 as previously described. This can be accomplished by thermal welding, ultrasonic welding, bonding, contact, or other known method.

In the preferred embodiments, the base sheet 202 and fiber mat 203 are formed from thermally weldable materials, and the laminate of the base sheet 202 and fiber mat 203 are heated and compressed with a hot roll to bond the two surfaces together. Alternatively, if the base sheet 202 or fiber mat 203 are not weldable, a thermally bondable material such as hot melt adhesive can be laminated between them, or bonding can be carried out by directly applying an adhesive between the two layers.

As discussed above, the fiber mat 203 or base sheet 202 may be coated with a chemical agent for improving foreign matter trapping performance, particulary of known allergens such as those disclosed in U.S. Pat. No. 6,777,064. Examples of such chemical agents include liquid paraffin and other mineral oils, silicone oils and nonionic surfactants.

When the preferred cleaning pad is incorporated into the preferred cleaning system 22, the fiber mat 203 is laminated onto one side of the base sheet 202 and bonded at a central bonding region 204. In addition, bonding is carried out at spot-bonded regions 207 formed discontinuously along parallel lines between the two edges 212a and 212b parallel to the center bonding region 204. Thus, a cleaning pad 28 is formed in which the two ends in the lengthwise direction of the fibers of the fiber mat 203 are not bonded to the base sheet 202.

Figure 18:
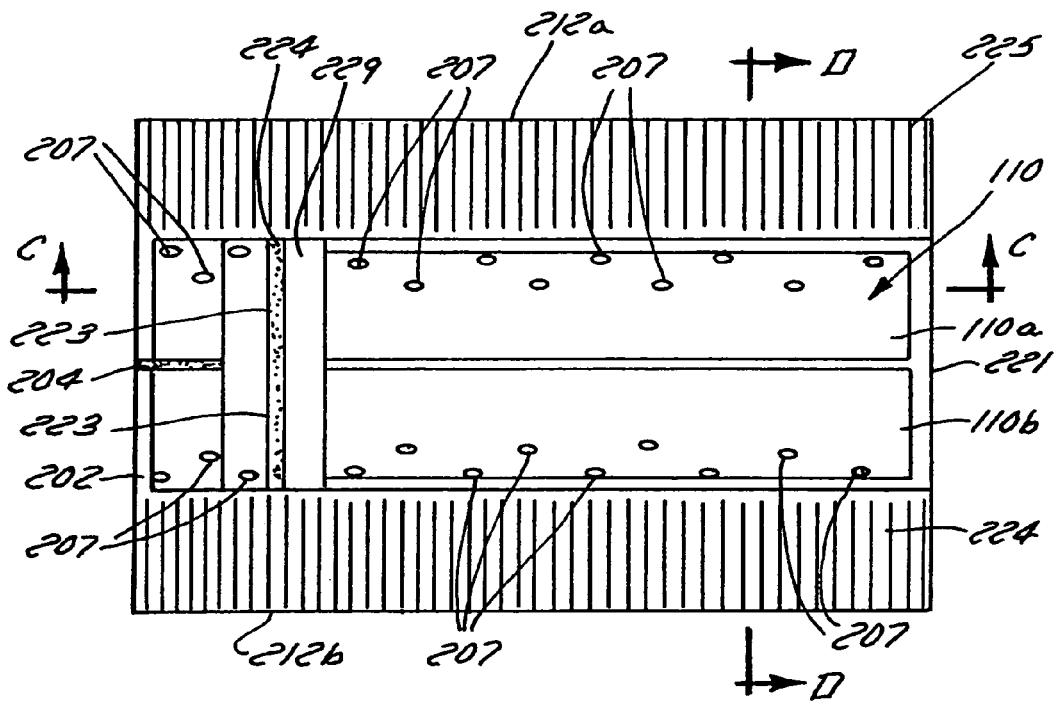
FIG. 18 is a top plan view of another preferred cleaning pad.
Figure 19:
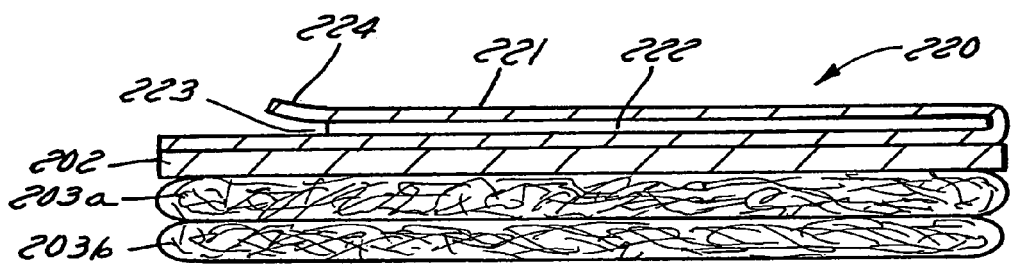
FIG. 19 is a cross sectional view of FIG. 18 taken along line C-C.
Figure 21:
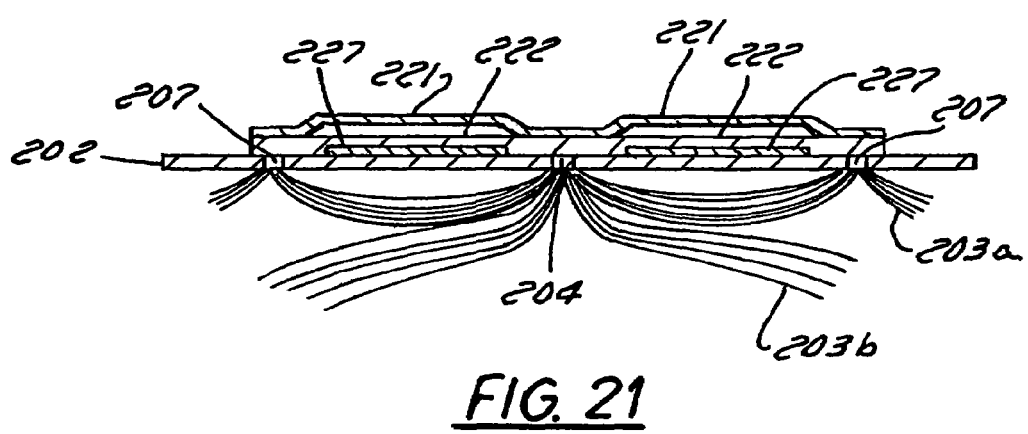
FIG. 21 is a cross-sectional end view of the cleaning pad illustrated in FIG. 18 taken along line D-D.

As illustrated in FIGS. 18, 19 and 21 pockets or sleeves 110 of the cleaning pad 28 are formed by laminating and bonding a retaining sheet 221 on the back surface of base sheet 202 (opposite the fiber mat 203), thereby forming a retaining opening 222 consisting of space whereby the arm of the attachment members 108a, 108b of the cleaning tool 22 can be inserted and retained. In one embodiment, the retaining sheet 221 is bonded to the base sheet 202 along the central bonding line 204 and spot bonding regions 207 thereby defining two sleeves 110a, 110b. The retaining sheet 221, need not be bonded along the same lines as the fiber mat, and may take a variety of configurations so long as it defines a retaining opening 222.

As best illustrated in FIG. 18, base sheet 202 of the cleaning pad 28 may also be provided with numerous cuts or fringes 225 that are cut in the same direction as the lengthwise direction of the fibers of the fiber mat 203. The fringes 225 increase the surface area of the cleaning pad 28 and improve dust adhesion to the base sheet. As discussed below, a cleaning pad 28 may also be used without fringes along the base sheet 202.

Figure 20:
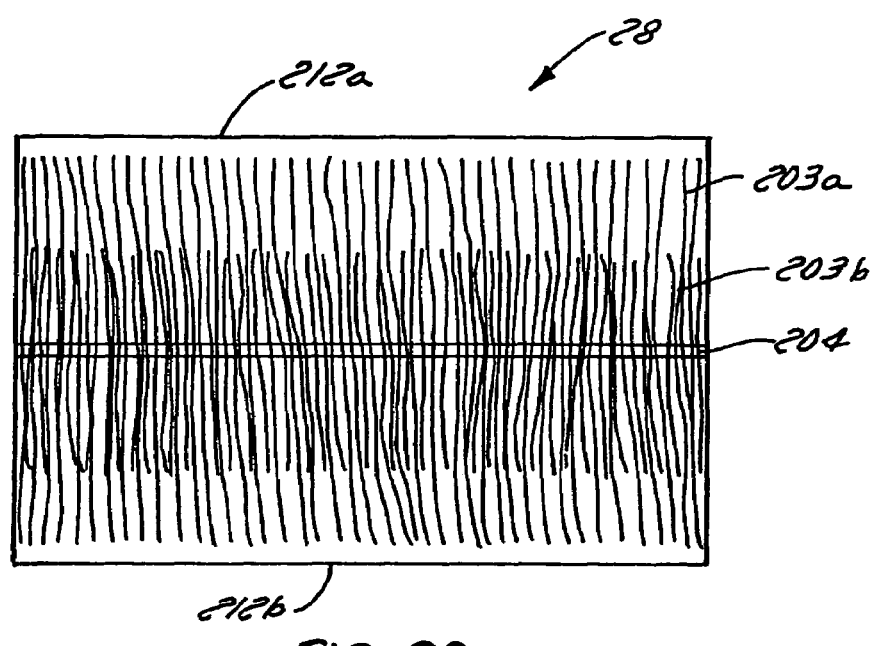
FIG. 20 is a bottom plan view of the cleaning pad illustrated in FIG. 18.

FIGS. 19-21 illustrate another preferred embodiment of the cleaning pad 28 wherein the fiber mat 203 is formed by superimposing two or more fiber mats 203a, 203b constructed from different types of constituent fibers, different fiber sizes or different colors. Superimposing the various fiber mats provides for a cleaning pad 28 having different properties. In one preferred embodiment, a fiber mat 203a with thicker fibers alternates with a fiber mat 203b of thinner fibers. For example a fiber mat with a size of 0.01-0.05 mm is preferred in the thin mat 203a and a fiber mat with a size of 0.06 mm-0.3 mm is preferred for the thick mat 203b. In addition, it is preferable to use a fiber with high stem strength such as polypropylene or nylon for the thick fiber mat 203b. The thick fiber mat 203b is preferably constructed from bunched fibers formed by splitting drawn polypropylene tape in the direction of drawing. The thick polypropylene fiber mat 203b is preferably only bonded only at the central bonding line 204 to the preferred thin mat 203b formed from bi-component tow fiber consisting of a polypropylene core and a polyethylene outer surface. Thus, as illustrated in FIG. 21, the thick fiber mat 203b hangs freely from the cleaning pad 28. As a result, the fiber pad appears bulkier or fluffier.

The dual fiber mat 203 may be produced by laminating the thin sheet 203a to the base sheet 202 as described in reference to FIGS. 14-17. The thick fiber mat 203b is then layered over the thin fiber mat 203a and bonded along the center bonding line 204.

Although the layering of alternative fibers in the fiber mat can be carried out in a variety of ways, in the illustrated embodiment the thick fibers 203b are on the exterior (on the side of the surface to be cleaned). This arrangement works particularly well for cleaning surfaces or appliances that include fine gaps such as a computer keyboard. The thin fibers 203a do not have body, and so they tend not to enter into the gaps. In contrast, however, the thick fibers 203b exhibit greater stem strength, and as a result they more easily enter into the gaps, allowing dust, dirt and other foreign matter to be lifted off the surface to be cleaned. In addition, thick fibers 203b serve to prevent entanglement of the narrow fibers and as well as provide a rougher surface to remove debris stuck to a surface.

In the illustrated embodiment, the length of the thick fiber mat 203b in the lengthwise direction of the fibers is preferably somewhat shorter than the length of the thin fiber mat 203a, but the lengths may vary depending on the application.

Figure 22:
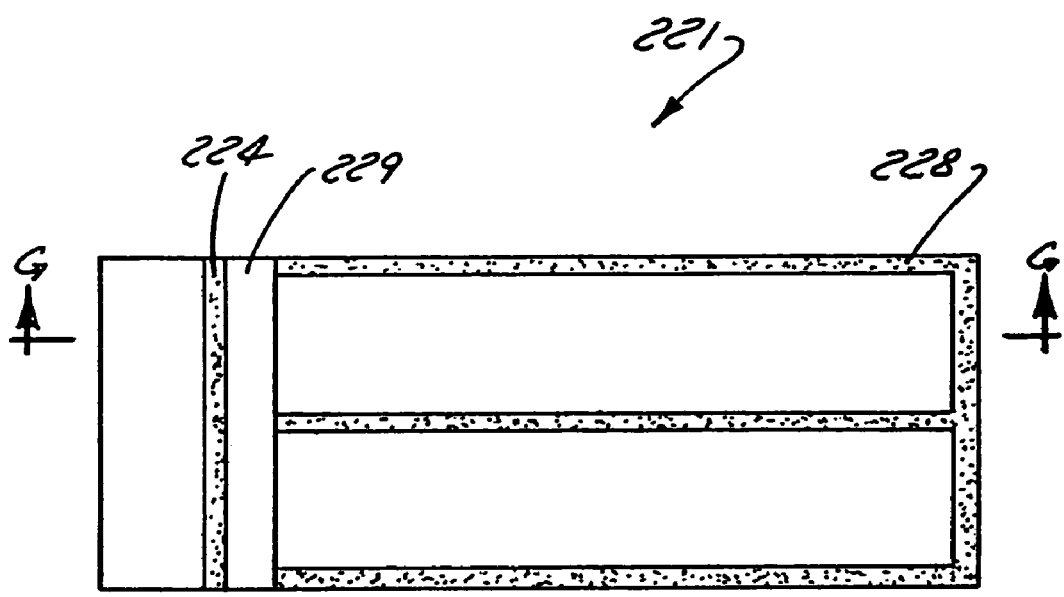
FIG. 22 is a top plan view of one embodiment of a retaining sheet for use with the cleaning pad.
Figure 23:
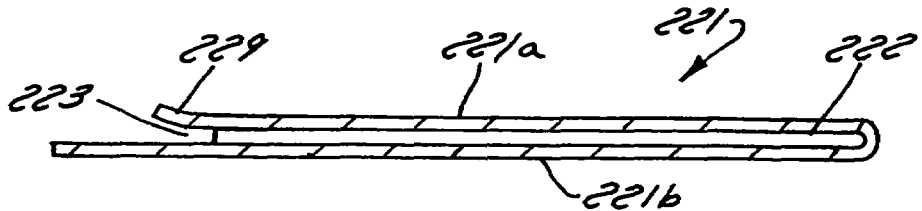
FIG. 23 is a cross sectional end view of the retaining sheet taken along line G-G of FIG. 22.
Figure 24:
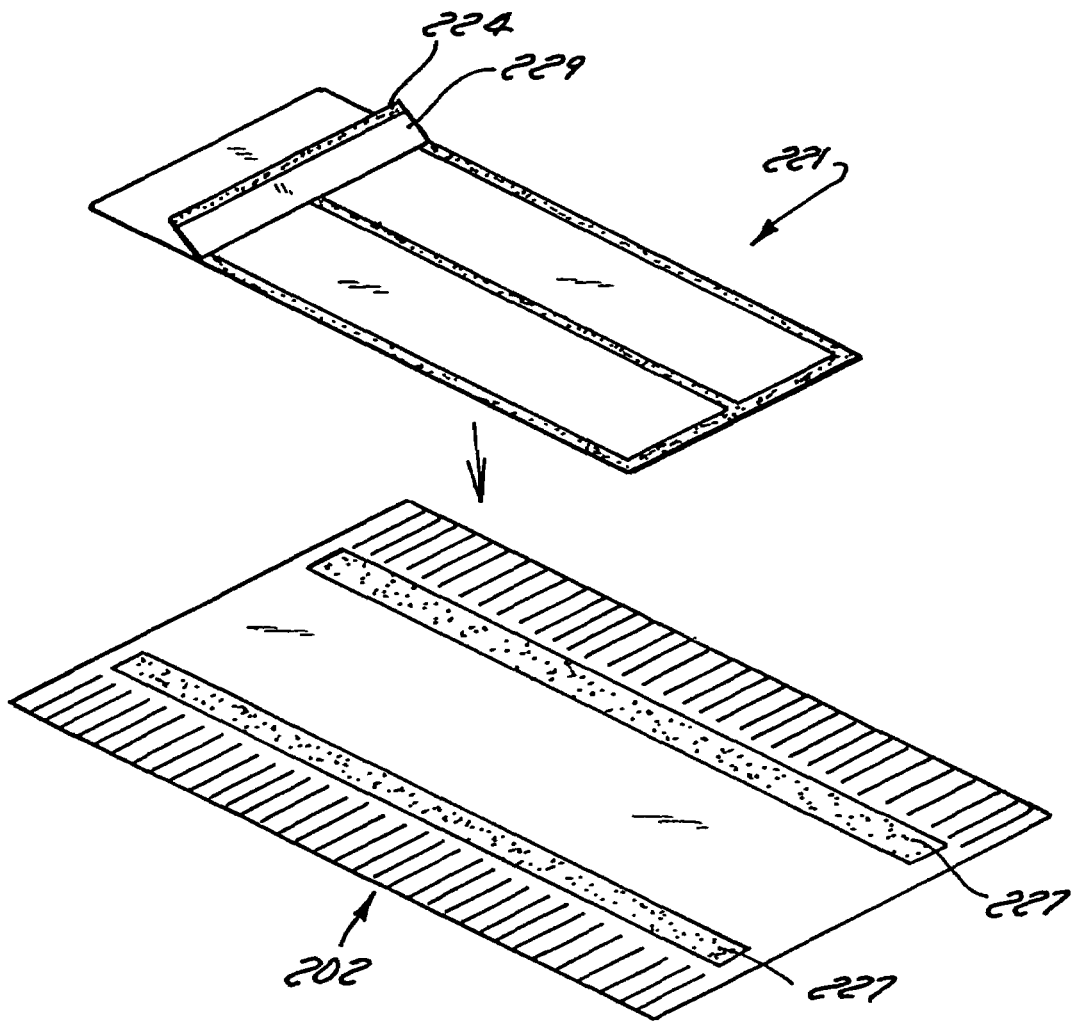
FIG. 24 is a perspective view of the placement of the retaining sheet onto the base sheet of the cleaning pad.

FIGS. 22-24 illustrate another preferred embodiment of the cleaning pad 28, or more particularly the retaining sheet. The retaining sheet 221 of cleaning pad 28 is produced by laminating two sheets of nonwoven cloth 221a and 221b, heat-sealing and bonding the center and three sides, to define an insertion opening 223. A sack-form retaining part 222 consisting of a space for inserting and retaining the attachment members 108a, 108b is formed between the two nonwoven cloths 22 1a and 221b.

As illustrated in FIG. 23, the insertion opening 223 of the retaining sheet 221 is formed. The retaining sheet 221 shown in FIG. 25 may alternatively be produced by folding a single non-woven cloth in two, and heat sealing prescribed locations thereof, to create an insertion opening 223. The upper nonwoven cloth 221a is formed so that it can curve freely upwards at the edge of the sealed region 228 and thus functions as a border 229 that is not bonded to the nonwoven cloth 221b underneath.

In one preferred embodiment, a colored region or other indicia 224 may be provided at the end of the border 229 indicating the orientation of the insertion region 223. Thus, when the upper nonwoven cloth 221a is made longer than the lower nonwoven cloth 221b and the border 29 is provided, insertion of the attachment members 108a, 108b can be carried out easily and smoothly.

As an alternative to providing a colored part as the indicia 224 on the border 229 of the retaining sheet 221, an embossing process can be carried out in order to provide a raised or lowered pattern at the same location. By providing indicia or on the insertion opening side 223 of the retaining sheet 221, the area where the attachment members 108 are to be inserted can be readily identified.

As illustrated in FIG. 24, the retaining sheet 221 is attached to the base sheet by 202 by applying hot-melt adhesive 227 in the center of the base sheet, and then laminating and heating the above retaining sheet 221 and base sheet by a means such as heating or compression welding. Affixing of the retaining sheet 221 to the cleaning pad 28 can be carried out using adhesive or pressure-sensitive adhesive, as well as hot melt adhesive.

Attachment of the cleaning pad to the attachment members 110 is carried out by inserting the attachment members 110a, 110b into the insertion opening 223 of the retaining sheet 221 so that it is retained in the retaining part 222. When the cleaning pad 28 becomes soiled, the arm attachment members 110 are pulled out of the insertion opening 223, a fresh cleaning pad 28 is put in place.

Due to the combination of the bonding of the fiber mat 203 at a central bonding region 204 as well as spot-bonded regions 207, and because the ends of the fibers of the fiber mat 203 in the lengthwise direction are not bonded to the base sheet 202, the fibers of the disclosed fiber mat 203 are highly napped in comparison to prior art cleaning pads, allowing the formation of a voluminous region of the fibers. This provides a significant advantage over the less voluminous cloths of the prior art. Both ends in the lengthwise direction of the fiber mat 203 of the sheet hang downwards, so that the tips of the fibers at both fiber ends are released from the base sheet and are free to move. As a result, the disclosed fiber mat 203 has superior trapping performance and retention capacity with respect to dust, dirt and various types of foreign matter relative to conventional sheets for cleaning implements in which long fiber filaments are cut and then napped at the surface or sandwiched between two carrier sheets.

FIGS. 25-28 illustrate additional preferred embodiments of the cleaning pad 28, configured to further increase the volume of free fibers of the fiber mat 203 in the cleaning pad 28, thereby increasing dust adhesion over prior art designs. It should be understood, that the various features of the cleaning pad 28 described in the different embodiments can be combined in a variety of ways and none are mutually exclusive. For example the central bonding line 204 can be combined with the spots 407 described below. Each embodiment includes a plurality of potential alternative joining locations 440 that may include, for example spots 407, or line sections 444.

Figure 29:
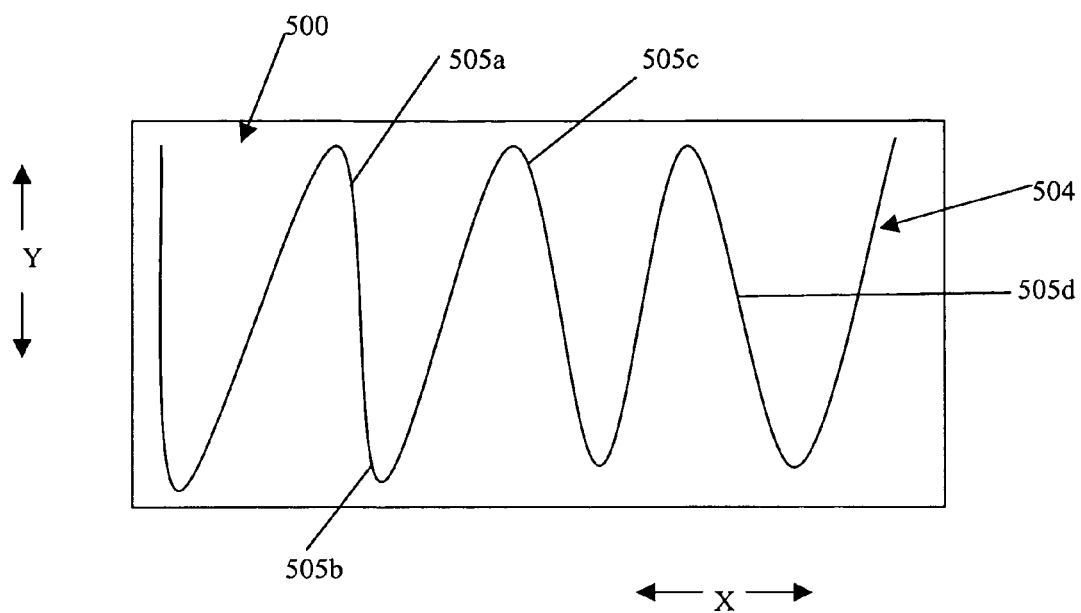
FIG. 29 is a plan view of a base sheet of a cleaning pad illustrating another alternative bonding orientation.
Figure 30:
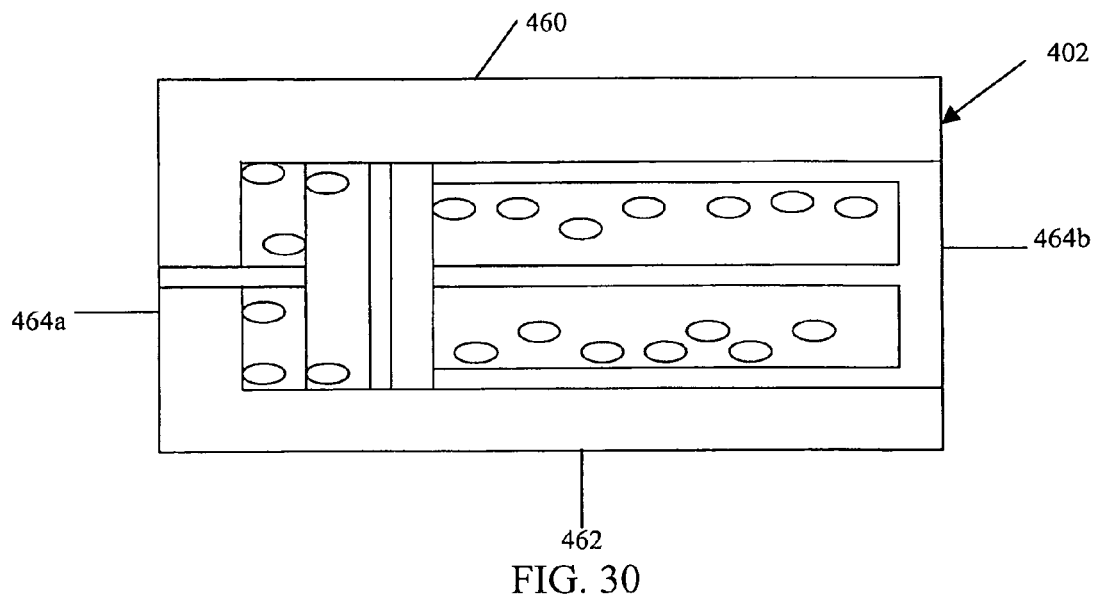
FIG. 30 is a top plan view of a cleaning pad illustrated in FIG. 18 using a base sheet without strips.
Figure 32:
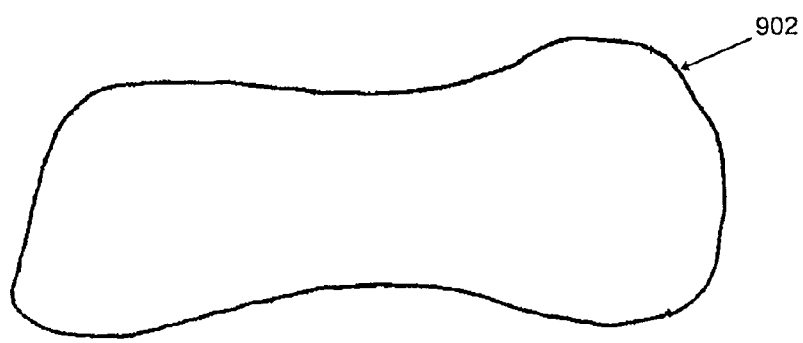
FIG. 32 is a plan view of a base sheet with a non linear outer edge.
Figure 31:
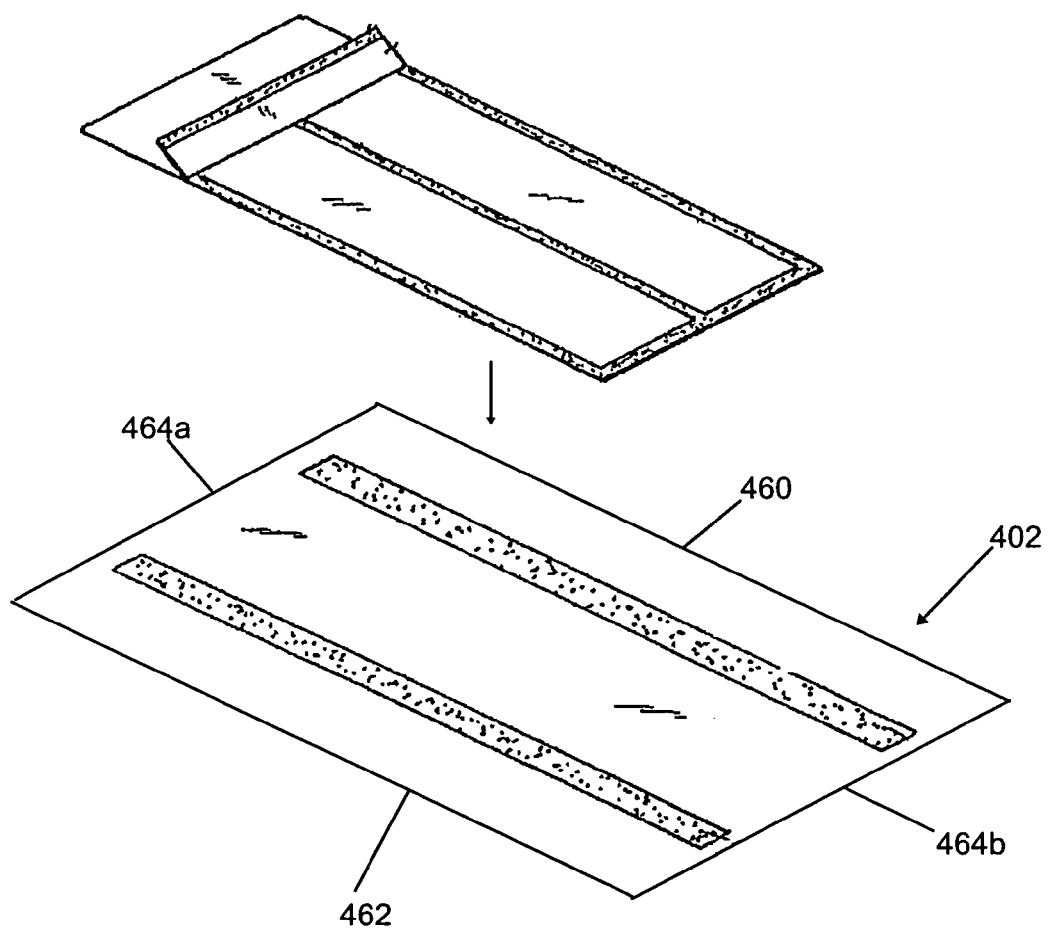
FIG. 31 is a perspective view of the placement of the retaining sheet onto the base sheet of the cleaning pad illustrated in FIG. 30.

FIGS. 25-32 illustrate examples of "fringeless" base sheets 302, 402, 502, 602. Base sheet 402 may be constructed from a nonwoven or other known material as described above. Base sheet 402 includes an outer unperforated, uncut outer edge 484. The outer edge 484 is defined by a straight, unperforated, uncut upper edge 460, a straight unperforated, uncut lower edge 462, and straight, unperforated, uncut side edges 464a, 464b. Removal of the cuts or fringes 225 of the previous embodiment has been shown to increase the fluffiness and total open fiber of the cleaning pad in comparison to a base sheet including the fringes. A base sheet 902 may also include an irregular or curved shape as illustrated in FIG. 32 without the fringes. It should be understood that the fringeless base sheet 402 may be used with the previous embodiments, and is no way limited to the embodiment shown in FIGS. 25-32. For example, FIGS. 30 and 31 illustrate the previously described cleaning pad 28 with the fringeless base sheet 402.

Figure 25:
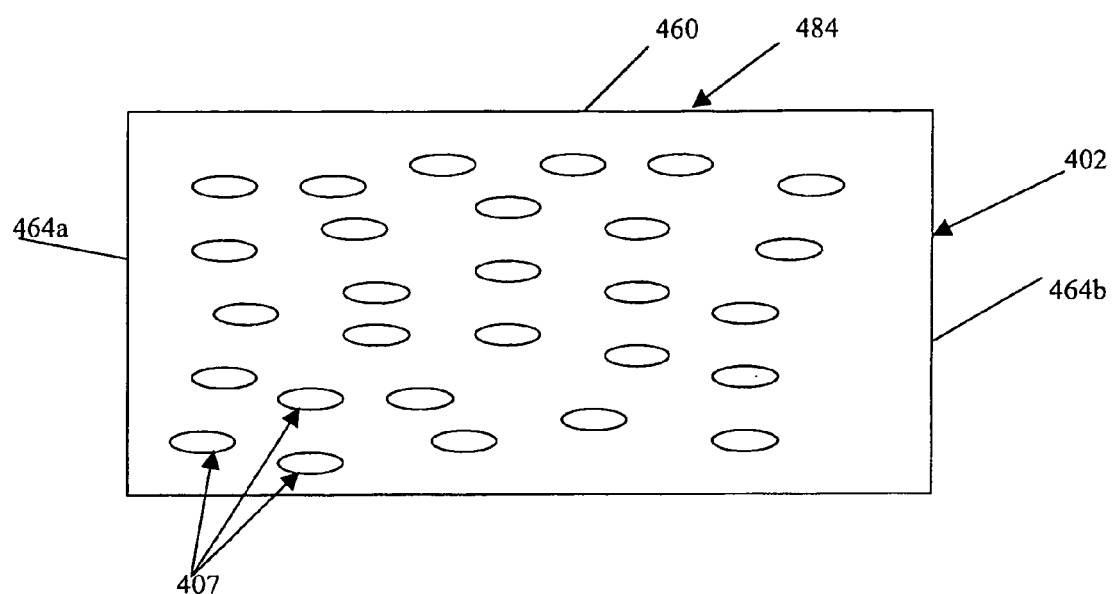
FIG. 25 is a plan view of a base sheet of a cleaning pad illustrating an alternative bonding orientation and an uncut outer edge.

FIG. 25 illustrates a first alternative bonding configuration. As illustrated in FIG. 25, the cleaning pad includes a base sheet including a plurality joining locations 440. The joining locations 440 may include spot bonding regions 207 such as discrete points, joining points, weldments or spots 407 for attachment of a combination of fibers or strips such as fiber bundle mat 203. Joining locations 440 may also include the central bonding line 204 described above or the individual line sections 444 described below. Spots 407 are randomly orientated along the base sheet 402 and illustrate potential locations for the nonwoven fibers to be attached as previously described. Although not shown in FIGS. 25-29, it is understood that the base sheet 402 is configured for attachment of a fiber bundle mat 203 as previously described.

Figure 27:
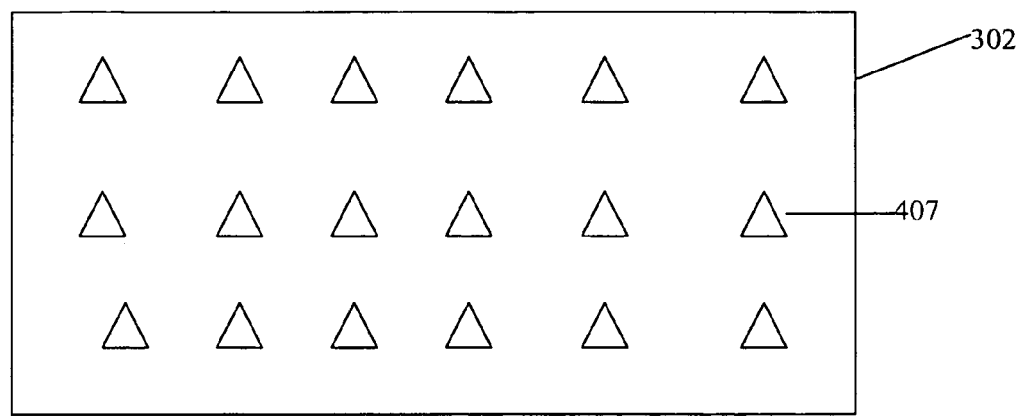
FIG. 27 is a plan view of a base sheet of a cleaning pad illustrating another alternative bonding orientation and triangular shaped spots.

In the illustrated embodiment, the spots 407 are circular in shape. It is understood, however, that the spots 407 could take a variety of shapes. As illustrated in FIG. 27 spots or weldments 407 are triangular shaped. Numerous other configurations could be utilized as well, including, but not limited to, line portions, curved line portions, squares, rectangles, dashes and numerous other geometric shapes. Spots 407 can be randomly orientated on the base sheet 407 or ordered in lines or other configurations. The number of spots can be altered to achieve optimal open fiber and fluffiness in the fiber bundle mat 203 as described in greater detail below.

Figure 28:
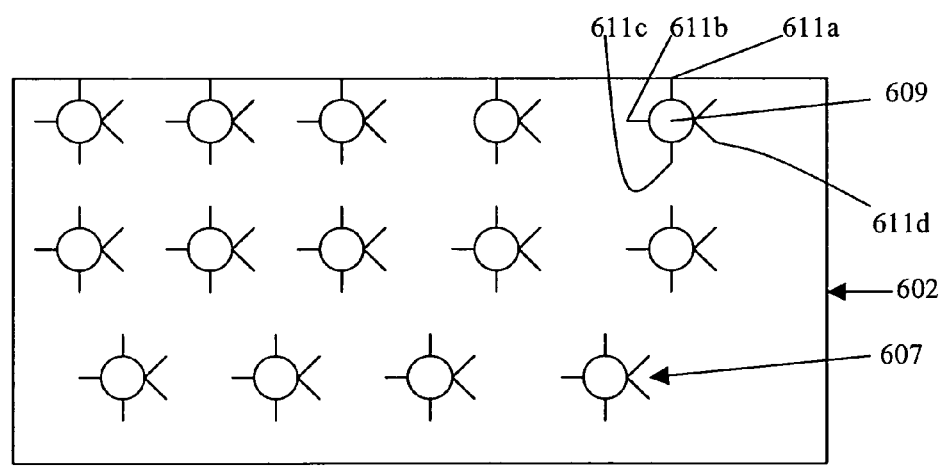
FIG. 28 is a plan view of a base sheet of a cleaning pad illustrating another alternative bonding orientation and star shaped spots.

FIG. 28 illustrates another embodiment of the base sheet 602. As illustrated in FIG. 28, the base sheet 602 includes "star shaped" or "asterisk shaped spots" 607. Spots 607 include a central spot 609 with a plurality of line portions, for example, 611a-d extending therefrom. The central spot 609 can also take a variety of alternative shapes, as can the line portions 611a-d.

As previously illustrated in FIGS. 18 and 20, a single central bonding line 204 could be added to a base sheet 202 with spot bonding regions 207. As alternatively illustrated in FIG. 26, a discontinuous central bonding line 406 may also be utilized. The discontinuous central bonding line 406 is comprised of a plurality of individual line sections 444. It should be understood that a plurality of discontinuous lines could be used.

FIG. 29 illustrates another embodiment of a base sheet 502. Base sheet 502 is similar to those previously described, and can be fringeless or include fringes. Base sheet 502 includes a single curved or sinusoidal shaped bonding line 504 extending across the bonding surface 500 of the base sheet. As illustrated in FIG. 28, the curved bonding line 504 traverses across the base sheet 502 to provide a plurality of discrete bonding locations e.g, 505a-d. As illustrated by FIG. 28 the curved bonding line 504 provides for an infinite number of discrete bonding locations 505a-d along different points of the curved line 504. Due to the arcuate nature of the curved bonding line 504, many of the discrete bonding locations, for example, 505a-d along the curved line are located at unique positions along both the x and y axis of the base sheet 502 in comparison to other discrete bonding locations along the curved bonding line 504.

It is understood that the curved bonding line 504 could take on a variety of alternative configurations than that illustrated in FIG. 29 so long as it provides multiple bonding locations at unique positions along both the x and y axis of the base sheet 502 in comparison to other discrete bonding locations along the curved bonding line 504. In addition, multiple curved bonding lines 504 could be utilized.

Figure 33:
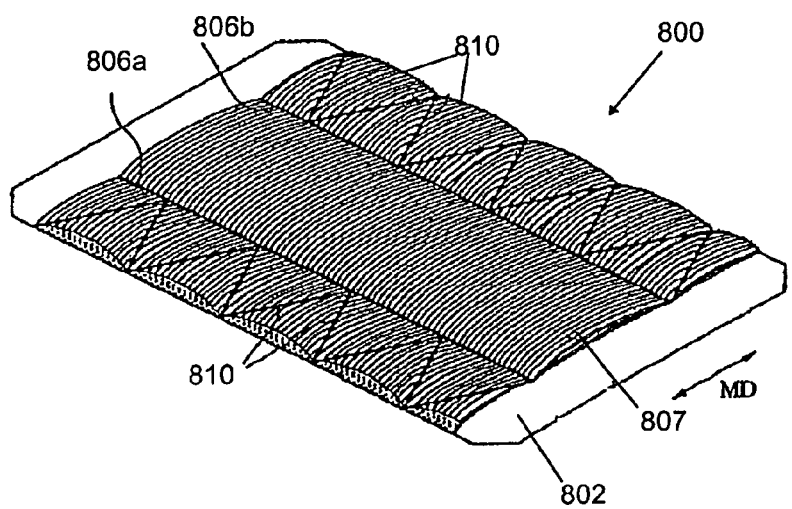
FIG. 33 is a perspective view of a prior art base sheet.

Each of the above disclosed embodiments in FIGS. 18-32 provide a significant advantage over known prior art cleaning pads. Specifically, the disclosed embodiments provide for a cleaning pad 28, with a substantial increase in free fiber within the fiber mat 203 resulting in increased fluffiness within the fiber mat 203 and greater dust adhesion. FIG. 33 illustrates one example of a portion of a prior art cleaning pad 800. FIG. 33 illustrates a fiber bundle or fiber mat 807 bonded to a base sheet 802. As illustrated by the drawings, the individual fibers of the fiber mat 807 are bonded to the base sheet 802 at bonding lines 806a, 806b. In addition, the fibers of the fiber mat 807 are bonded at joining lines 810. This bonding architecture results in a tightly bonded fiber mat 807, with extremely minimal amounts of free fibers in the fiber mat 807. As a result, the prior art cleaning pad 800 has a tendency to push dust across a surface as opposed to retaining and absorbing dust.

In contrast, the disclosed embodiments of the cleaning pad 28 provide a significant advantage over the prior art cleaning pads. For example, in the illustrated embodiments, the fibers of the fiber mat 203 are bonded at one or more joining locations 440 such as spots 207 in a variety of ways to achieve a preferred amount of free fiber in the fiber mat 203. In one embodiment, 100% of the individual fibers of the fiber mat 203 are connected to the nonwoven or base sheet 402 at one joining location 440 such as spot 407 and between 5-90% of the fibers are connected at two joining locations 440 such as spots 407. In another embodiment, 100% of the individual fibers of the fiber mat 203 are connected to the nonwoven or base sheet 402 at one spot 407 between 5-70% of the fibers are connected at at least two spots 407. In another alternative, 100% of the individual fibers are connected to the nonwoven sheet at one spot and less than 80% of the fibers are bonded at at least two spots.

A similar fiber open architecture can be achieved using a central bonding line 204 and plurality of spots 407. For example, in one embodiment, 100% of the fibers of the fiber mat 203 are connected to the nonwoven sheet at the central bonding line 204 and between 5-90% of the fibers of the fiber mat are bonded at at least one spot 407. In another preferred embodiment, 100% of the fibers of the fiber mat 203 are connected to the nonwoven sheet at the central bonding line 204 and between 5-70% of the fibers are connected at at least one spot 407. In still another embodiment, 100% of the fibers of the fiber mat are connected to the nonwoven sheet at the central bonding line 204, and less than 80% are connected at at least one spot 407.

Figure 26:
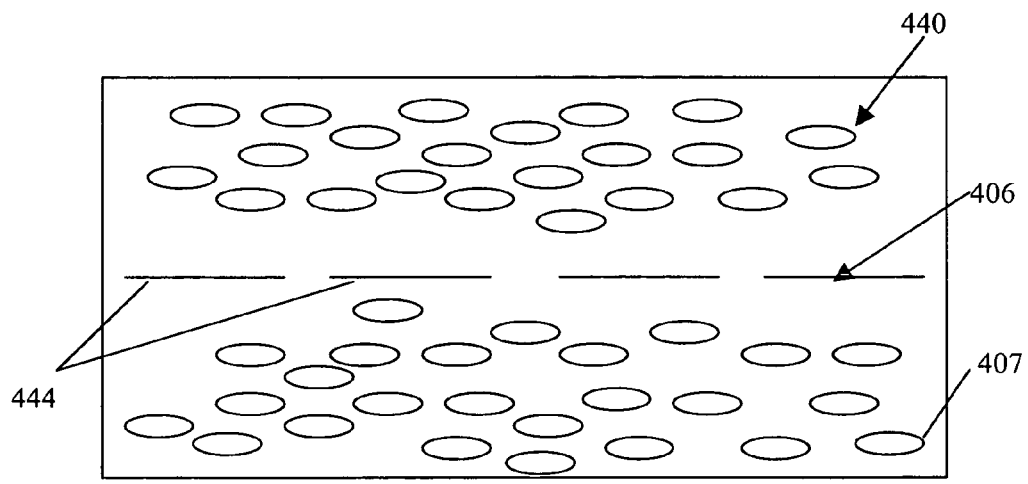
FIG. 26 is a plan view of a base sheet of a cleaning pad illustrating another alternative bonding orientation.

The preferred open architecture can also be achieved by bonding the fiber mat 203 to the base sheet 402 using the discontinuous central bonding line 406 illustrated in FIG. 26. In one preferred embodiment, between 10-90% of the fibers are connected to the discontinuous central bonding line 406. In another embodiment, 80% of the fibers are bonded to the discontinuous central bonding line 406.

As noted throughout the application, the previously described bonding configurations can be utilized to achieve a preferred amount of free fiber in the fiber mat 203. In the described preferred embodiments illustrating a central bonding line 204 or discontinuous central bonding line 406 at least 80% of the total fiber bundle comprises fibers that are free along at least 50% of their length from the central bonding line. Such fibers include fibers that are bonded only at a central bonding line 204 or discontinuous central bonding line 406 as well as fibers that are bonded at a central bonding line 204 or discontinuous central bonding line 406 and at another bonding location less than one half of the length of the fiber from the central bonding line 204 or discontinuous central bonding line 406.

The architecture described above allows for the attachment of fiber bundle or fiber mat 203 such that a plurality of individual discrete micro channels is defined within the fiber bundle for retaining dust. For example, when the fiber mat or fiber bundle 203 is bonded to the base sheet by a plurality of joining points or spots 407, a plurality of discrete fiber clusters are produced. The individual fibers branching from a single joining point or spot 407 define the fiber clusters. Micro channels are formed between the fibers of the fiber clusters. When the spots are randomly orientated, so too are the fiber clusters and micro channels. This is advantageous over the prior art illustrated in FIG. 33, wherein the fiber clusters are uniformly formed.

The above-described preferred embodiments of the cleaning pads 28 are particularly well suited for the inventive system 20 that is capable of either wet, damp or dry cleaning or dusting. Known prior art cleaning pads and more particularly dusting pads have been hydrophobic. As a result, the prior art cleaning pads are not capable of using the inventive advantages of the use of low levels of a liquid product.

The present cleaning pad allows for an inventive wet damp or dry dusting method. In particular, the inventive system 20 uses a low level of liquid product combined with a dry dusting or cleaning pad 28 to increase dust removal. In the preferred embodiment the liquid level used is between 0.01 to 0.3 g/sq.ft. Alternatively, the preferred liquid level applied to the cleaning pad is between 80 and 500 microliters. Particularly preferred is a range of between 120 to 130 microliters. As described throughout the application the liquid could be water, solvent or emulsion based intermediates.

c. Methods of Use and Methods of Cleaning

It should be appreciated from the above disclosure that the preferred cleaning tool 22, can be utilized to clean or dust a variety of surfaces. Due to the unique configuration of the tool 22, a user can conveniently alternate between wet, damp or dry cleaning or dusting. It is recognized that the component parts of the invention may be conveniently interchanged depending on the particular cleaning task at hand. For example, some of the disclosed cleaning pads 28 may be more suitable for use with some of the disclosed cleaning solutions or for dry dusting. Likewise, some cleaning pads 28 may include alternate surfaces configured for alternative cleaning tasks. Similarly, the particular cleaning solution utilized can be changed depending on the desired application. For example, one solution may be particularly well-suited for neutralizing allergens.

In order to perform dry dusting, a user may obtain the above mentioned cleaning system 20 that includes the preferred cleaning tool 22. A user holds the cleaning tool 22 such that the palm of the user's hand surrounds the handle portion 24. In the preferred embodiment, the palm of a user's hand extends over the top 29 of the handle portion 24 and the user's fingers extend at least partially around the fluid reservoir 30. In the illustrated embodiment, a user's hand is typically orientated in a manner such that a user may insert his or her index finger through the hole 32 extending through handle portion 24. However, it is recognized that in performing dry dusting tasks, the fluid reservoir 30 need not be present. In one alternative the handle portion may be the type as shown in U.S. Pat. Pub. No. 2004/0034956 A1.

Once the user obtains the tool 22, a user then places the cleaning pad 28 onto the cleaning pad support member 26. As noted above, the cleaning tool may be used with a variety of alternative cleaning pads 28. In the preferred embodiment, the sleeve-like cleaning pad 28 is mounted over the attachment members 108a, 108b so that all of the retaining tabs 112 are within the sleeves 110a, 110b. Once secured, the user then positions the cleaning pad 28 onto a surface to be cleaned and moves the cleaning pad 28 on the surface to be cleaned. The movement of the cleaning pad 28 across the surface to be cleaned causes dust or other debris to be collected by the cleaning pad 28. In the illustrated embodiment, dust or other debris is collected by the cleaning surface 111 of the cleaning pad 28. The user may, depending on the surface to be cleaned, pivot the cleaning pad support member 28 to accommodate hard to reach places. For example, if a user desires to dust an overhead lintel, the user may pivot the cleaning pad support member 26 to an angle of about 90° in relation to the handle portion 24.

A preferred dusting or cleaning pattern consists of a side to side overlapping motion starting in the upper left hand (or right hand) side of the section to be cleaned, and progressing the wiping pattern across the surface to be cleaned while continuing to use side to side wiping motions. Another preferred wipe pattern consists of an up-and-down wiping motion. The preferred wiping patterns allow the cleaning pad 28 to loosen dirt and dust, and provide a better end result. Another benefit of the above wiping patterns is minimization of streaks as a result of improved spreading of solution (in wet dusting).

It is recognized that wet dusting or cleaning can be done separately from, in conjunction with or in addition to dry dusting. For example, a user may perform an initial dry dusting run and then proceed with wet dusting or cleaning. In the context of wet cleaning or dusting, similar steps are performed to those described above in the context of dry dusting. However, if necessary, the cleaning fluid reservoir 30 is initially inserted into the fluid reservoir-receiving cradle 36. The fluid reservoir 30 in inserted between the handle portion sidewalls 21a, 21b and within the two U-shaped supports or rails 44 and 46. The fluid reservoir 30 is press fit into the cradle such that the triangular retention tabs 42a, 42b frictionally engage and retain the lower sidewall 53 of the fluid reservoir 30. The reservoir should be press fit such that the first bottleneck receiving support 44 fits around the fluid reservoir 30 near the junction 59 of the second 55 and third 57 sections of the reservoir 30. The second U-shaped spray cap receiving support 46 fits around, retains and orientates the spray cap 61 of the fluid reservoir 30. The spray cap receiving support flanges 71a, 71b press fit around flats 63a, 63b of fluid reservoir spray cap 61 when the reservoir is placed within the cradle 36. The tight fit defined by flanges 71a, 71b and flats 63a, 63b serves to properly orientate spray cap 61 within the fluid reservoir-receiving cradle 36 such that spray cap 61 faces in a direction away from the cradle 36.

During wet dusting or cleaning a variety of techniques may be employed consisting of combinations of wetting the surface and moving the cleaning pad 28 across the surface to be cleaned, wetting the cleaning pad 28 and moving the cleaning pad 28 across the surface to be cleaned, or a combination of the two.

FIG. 1 illustrates the cleaning system 20 in its cleaning position that is configured for wet cleaning wherein the cleaning solution is applied directly to the surface. As described above, in the cleaning position the cleaning pad support member 26 extends forwardly, pivot engagement tab 38 engages the cleaning position notch 102 of pivot member 82, and retention tabs 95 fit within the retention tab holes 87. In this position, the user may apply the water or other liquid housed within the fluid reservoir 30 directly onto the surface to be cleaned. The user may insert a finger through the opening 32 and depress the spray cap 61 thereby causing the discharge of the fluid housed within the reservoir 30.

FIG. 4 illustrates the cleaning system 20 in a second liquid application position. In order to move the cleaning pad support member 26 into the second liquid application position, a user holds the handle portion 24 and applies torque to the cleaning pad support member 26 to move it from the cleaning position illustrated in FIG. 1. As sufficient torque is applied to overcome the forces of the inventive engagement features, the circular pivot member 82 rotates downwardly into the liquid application position. In the second liquid application position, pivot engagement tab 38 engages the liquid application notch 104 of the pivot member 82 thereby holding the cleaning pad support member 26 is its angled liquid application state. In this position, the user may apply the water or other liquid housed within the fluid reservoir 30 directly onto the cleaning surface 111 of the cleaning pad 28. As noted above, the various cleaning positions may be used interchangeably. During dusting or cleaning a user may repeatedly rotate the cleaning pad support member 26 from its cleaning position to its liquid application position as needed. During wet dusting or cleaning, the user may use the above noted cleaning pattern.

Once the cleaning or dusting has been finished, the user may remove and dispose of the cleaning pad 28 and place the cleaning system 22 into its storage position (FIG. 3). To place the cleaning system 22 into the storage position the cleaning pad support member 26 is rotated backwards such that it is generally parallel to the plane defined by the longitudinal axis of the handle portion 24.

As noted above, a variety of cleaning solutions can be used with the inventive cleaning system. In one preferred method of light cleaning or dusting, the cleaning solution in the reservoir 30 is a mixed liquid that includes about 96.30% by weight tap water, 1% isoparaffinic hydrocarbon solvent, such as Isopar E from Exxon Mobil, 1% silicone fluid, preferably 1000 estks polydimethyl siloxane silicone oil from Dow Coming, General Electric Silicones or Rodia Chemical, 0.5% sorbitan monolaurate, 0.5% polyoxyethylene (20) sorbitan monolaurate or other emulsifier, and a quaternary such as 0.15% BTC 2125M from Stepen Chemicals. The balance of the preferred solution includes a fragrance and preservatives. This composition is ideally suited for dusting jobs. Use of the preferred solution with the inventive cleaning system provides an increase in dust and allergen retention as well as providing an improved shine to the surface to be cleaned. Fingerprints, smudges and other blemishes are also easily removed.

In another preferred embodiment, a cleaning solution includes 96.5125% by weight deionized water, 1.75% propan-2-ol anhydrous, 0.40% ethylene glycol monobutyl ether, 0.40% ethylene glycol n-hexyl ether, 0.125% propylene glycol, 0.10% monoethanolamine, 0.30% vinegar (white distilled 300 grain), and small amounts surfactants and other ingredients.

In another preferred embodiment, the cleaning solution includes 97% de-ionized water, 1.50% anhydrous propan-2-ol, 0.30% ethylene glycol N-hexyl ether, 0.13% industrial grade propylene glycol, 0.08% of a surfactant, 0.30% Mackam, 0.10% monoethanolamine, and small amounts surfactants and other ingredients.

In still another preferred embodiment, the cleaning solution includes 91.8% de-ionized water, 5.0% isoparaffinic hydrocarbon, 0.25% elfugin AKT, 0.15% sodium n-cocoyl sarcosinate, 2.0% silicone fluid, 0.15% sorbiatnmono oleate, 0.15% polyoxyethylene sorbitan monolaurate, 0.15% low freeze grade triethanolamine, 0.15% a preservative likeformeldahyde and small amounts of other ingredients.

In another embodiment, the cleaning solution includes 92.32% de-ionized water, 5% isoparafinnic hydrocarbon, 2% silicone fluid, 0.15% sorbian mono oleate, 0.15% polyoxyethylene sorbitan monolaurate, 0.03% triethanolamine, 0.15% a preservative similar to formaldehyde and small amounts of other ingredients.

It can be important to control dosing and coverage of the cleaning solution. In one preferred embodiment, the liquid level that should be used with the preferred cleaning pad via application to the cleaning surface is between 0.01 to 0.3 g/sq.ft. Alternatively, the preferred liquid level applied directly to the cleaning pad is between 80 and 500 microliters. Particularly prefered is a range of between 120 to 130 microliters. For best results, the product is applied at the above-recommended doses onto the surface to be treated or onto the cleaning pad 28. The cleaning pad 28 is then moved across the surface collecting dust and absorbing the cleaning solution if applied directly to the cleaning surface. Instructions for use of the cleaning system may include pictures and/or words detailing preferred application pattern and dosing. As noted above, the preferred composition of the solution is preferably mild and will not harm most surfaces.

As noted above, in the context of wet dusting, the cleaning solution can be distributed using the fluid reservoir 30. Optionally, for increased convenience, additional compositions can be delivered in the form of a pre-moistened cleaning pad 28.

Optionally, and most preferably, convenience and performance can be maximized by using a system composed of a disposable cleaning pad 28 as described hereinbefore. The pad can be composed of any one of the alternative cleaning pads 28 described above.

This cleaning system 22 and method of use provides multiple benefits versus conventional cleaning modes. It reduces time to clean or dust, because the cleaning pad retains a greater amount of dust and the preferred cleaning solution removes fingerprints smudges and other surface marks. It eliminates the need to carry a separate dusting or cleaning solution. Due to the high absorbency of the pad, especially when used in conjunction with the preferred cleaning solution, the pad absorbs and locks away dirt and dust, such that a single pad 28 can clean large surface areas.

Additionally, since a fresh pad 28 may be used every time, germs and dirt are trapped, removed and thrown away, promoting better hygiene. Conventional dusting tools, which are re-usable, can harbor dirt and germs, which can be spread throughout the household. Through operator-controlled dosing and more efficient removal of dirt, allergenss and dust, a better end result is also achieved.

Additionally, because the cleaning process involves use of low levels of solution in contact with the surface to be cleaned for much shorter periods of time relative to conventional cleaning systems, (e.g. the multiple steps of applying a separate cleaning solution and grabbing a cleaning tool are combined in the present invention), the system and method provide improved surface safety on delicate surfaces.

The cleaning pads 28 are versatile in that they can be used for multiple cleanings and multiple surfaces. Each pad is designed to clean at least one average size surface with an average debris or dust load. See, e.g. SCJ U.S. patent application entitled Artificial Testing Soil and Method of Testing, which was filed Dec. 30, 2005. The application is a continuation-in-part of U.S. patent application Ser. No. 10/172,637, filed on Jun. 14, 2002, which claims the benefit of U.S. Provisional Application Ser. No. 60/298,645, filed Jun. 15, 2001. Pads can be changed sooner if surfaces are larger than average, or especially dirty. If the pad needs changing the cleaning surface of the cleaning pad will be saturated with dust and/or dirt.

To maximize the synergy between the various cleaning, and dusting tasks, the present methods can be carried out using several varying executions and instructions for use. In one embodiment, a kit can be provided that has multiple cleaning pads and solutions for different cleaning tasks. For example, one solution and cleaning pad could be used for surface cleaning and another solution and pad for dusting. Such a kit may be sold with advertising and instructions in each kit being used to explain the benefits of using the various products together.

It should be further understood the present invention contemplates a variety of additional alternative configurations and component parts which may be attached within the pivot member receiving cavity 50 of the handle portion 24. A wide variety of alternative interchangeable cleaning implements may be substituted for the cleaning pad support member 26 described above. The alternative cleaning implements would preferably include a support member with a modular design which includes a universal pivot member or other attachment member similar to that described in the preferred embodiment such that the alternative implements could be used interchangeably with the preferred handle portion 24. For example, alternative cleaning implements include but are not limited to a squeegee for cleaning windows, mirrors or other glass structures, a soft surface cleaner such as a lint roller, a glass cleaner including an indexing refill roll, an insect swatter, a dog brush or other grooming implement, a scrub brush or other cleaning implement etc. Numerous other pivotally or movably attached cleaning implements are also within the scope of the present invention.

It is understood that the component parts of the inventive system 20 described above may be manufactured and sold separately or together in the form of a cleaning system or kit. Furthermore, although the preferred embodiment illustrates a handle portion 24 pivotally connected to a cleaning pad support 26, it is recognized that the present invention is in no way limited to such a construction. For example, the inventive cleaning system 20 could be constructed as a single non-movable piece allowing only surface spraying of the cleaning fluid. Likewise, the cleaning pad support need not be pivotally attached to the handle portion as described in the preferred embodiment. Numerous alternative embodiments that allow for movement of the cleaning pad support 26 in relation to the handle portion are within the scope of the invention. The cleaning pad support member 26 and handle portion 24 may alternatively be slidably connected, hingedly connected, bendable or otherwise movable into its various desired orientations. A spring loaded lock switch could be used to allow 180° rotation of the cleaning pad support member 26. The cleaning pad support member 26 could include a centrally located pivot member to allow for 360° rotation. Alternatively, the handle portion could be rotatable 360° in relation to the cleaning pad support member 26. Additionally, the handle portion 24 could include an integral or attachable telescoping extension to allow for dusting or cleaning areas outside of a normal user's reach.

Additionally, the handle portion as described could be eliminated completely and the fluid reservoir could be arranged to form the handle of the cleaning system. The pivotable attachment member could be attached to the upper end of the fluid reservoir. Further, although the spray bottle described herein is a physically separate module, it will be manifest that the spray bottle may be directly integrated into, or form the handle portion with which it is associated. The reservoir could have a plug that could be removed when filling with fluid.

The cleaning pad support could alternatively be connected to the handle portion via a threaded connection. Such an orientation would allow for the ease of attachment and removal of the numerous alternative cleaning implements that are within the scope of the present invention. The cleaning pad support could also be alternatively arranged to rotate in either a vertical or horizontal direction to accommodate various cleaning functions. The cleaning system could further include a motorized spinning head for additional efficacy and less effort on behalf of the consumer. In one embodiment, the implement and duster may also be configured to be attachable to a vacuum.

Although the cleaning fluid delivery system has been described in reference to the fluid reservoir, it is recognized that alternative configurations for delivering cleaning fluid to a surface to be cleaned or to a cleaning media are also within the scope of the present invention. For example, the fluid reservoir could be arranged in a manner such the cleaning fluid is sprayed or applied on the back surface of a cleaning pad or cloth and allowed to move through the cloth via a wicking action. Alternatively, the attachment members or tines 108a, 108b of the cleaning system could be in fluid communication with the cleaning fluid reservoir such that cleaning fluid may be discharged on a cleaning pad 28 via the attachment members 108a, 108b. Such a delivery system could deliver cleaning fluid through the tip, bottom, top or lateral sides of the attachment members. Alternatively, the liquid delivery system could include a flip out nozzle or reservoir configured for spraying cleaning fluid onto the cleaning media. Such a configuration would eliminate the need for a pivoting support member.

d. Method of Manufacture

A wide variety of molding and manufacturing techniques can be used to manufacture the cleaning tool 22. In one embodiment, the method of manufacture generally includes making a handle 24 with a cradle for receiving a fluid dispenser 30, connecting a cloth support 26 to the handle 24, forming a cleaning cloth 28 by tapering fibers and allowing the cloth 28 to be fixed on the support 26 so that the fibers closest the handle 24 are shorter than the fibers closest to a free end of the support member.

The handle portion 24 is preferably constructed so that a pivot point is defined by the pivot member receiving cavity 50. The pivot member receiving cavity 50 is constructed such that it is located below a horizontal plane defined by the fluid reservoir 30 and is configured such that the pivot member receiving cavity 50 includes a cantilevered pivot engagement tab 38. The handle is also preferably constructed to provide for an opening 32 that allows a user single handed access into a reservoir receiving cradle 36 contained within the handle 24. The reservoir receiving cradle 36 is formed to define a plurality of grooves 39 configured to engage and lock the spray bottle into the cavity.

Two U-shaped supports or rails 44, 46 are formed within the sidewalls of the handle and are molded to receive a spray bottle 30 within. Retention tabs 42a, 42b are also molded into the cradle 36 to frictionally engage and retain a lower sidewall of the spray bottle 30. In constructing the handle the handle 24, a plurality of structural support ribs 39 are formed which extend forwardly toward the pivot member receiving cavity 50. A pair of ears 49a, 49b are also formed into the handle 24. The ears are formed to include opposed grooves 52a, 52b on an inner cavity surface. The grooves 52a, 52b are preferably dimensioned to slidably engage axles 80a, 80b of a circular pivot member 82. The pivot member 82 is formed to include axles 80a, 80b. The bottle neck portion of the cradle is formed to define a first bottle neck receiving portion 44.

While a variety of methods may be employed, in one embodiment the cleaning tool 22 is formed using an injection molding process. The method includes injecting plastic in a mold to form a handle portion 24 of a cleaning tool. The mold is configured to define a handle portion 24 having an opening for accessing a fluid reservoir 30. A second mold is used to form a cleaning pad support 26. Plastic is inserted into a mold to form a cleaning pad support member 26. A blow molding process is preferably also used to form the fluid reservoir 30. In an final step, the component parts of the cleaning tool 22 may be assembled and/or packaged for distribution.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, as noted throughout the application the individual components need not be formed in the disclosed shapes, or assembled in the disclosed configuration, but could be provided in virtually any shape, and assembled in virtually any configuration, so as to provide for a cleaning system that includes preferably a cleaning fluid reservoir attached to cleaning implement support. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A cleaning pad comprising:
    a base sheet;
    a retaining sheet bonded to one side of the base sheet by a central bonding line and a plurality of spot bonds to form two sleeves for receiving attachment members of a cleaning tool; and
    a fiber bundle bonded to the side of the base sheet opposite the retaining sheet by the central bonding line and the plurality of spot bonds.

2. The cleaning pad of claim 1, further comprising a plurality of cuts in an edge of the base sheet.

3. The cleaning pad of claim 1, wherein the central bonding line is discontinuous.

4. The cleaning pad of claim 1, wherein the fiber bundle and the retaining sheet are comprised of a material allowing for thermal welding the combination of fibers and sheet together.

5. The cleaning pad of claim 1, wherein between 5-90% of fibers in the fiber bundle are connected by at least one spot bond.

6. The cleaning pad of claim 5, wherein between 5-70% of the fibers in the fiber bundle are connected by at least one spot bond.

7. The cleaning pad of claim 1, wherein less than 80% of fibers in the fiber bundle are bonded by at least one spot bond.

8. The cleaning pad of claim 1, wherein about 100% of fibers in the fiber bundle are connected to the base sheet at the central bonding line and between 5-90% are bonded by at least one spot bond.

9. The cleaning pad of claim 8, wherein between 5-70% of the fibers in the fiber bundle are connected by at least one spot bond.

10. The cleaning pad of claim 1, wherein about 100% of fibers in the fiber bundle are connected to the base sheet at the central bonding line and less than 80% of fibers in the fiber bundle are connected by at least one spot bond.

11. The cleaning pad of claim 3, wherein between 10-90% of fibers in the fiber bundle are connected to the central bonding line.

12. The cleaning pad of claim 11, wherein about 80% of the fibers are bonded to the central bonding line.

13. The cleaning pad of claim 1, wherein 80% of the fiber bundle comprises fibers that are free along at least 50% of their length from the central bonding line.

14. The cleaning pad of claim 1, further comprising spot bonds that are randomly orientated on the base sheet.

15. A cleaning pad comprising:
a nonwoven sheet;
a fiber bundle; and
a retaining sheet;
wherein the fibers in the fiber bundle are bonded to the nonwoven sheet at a joining line and between 5-90% of the fibers in the fiber bundle are bonded to the nonwoven sheet at at least one spot bond; and
wherein the retaining sheet is attached to the nonwoven sheet by the joining line and at least one spot bond.

16. The cleaning pad of claim 15, further comprising a plurality of spot bonds.

17. The cleaning pad of claim 16, wherein the spot bonds are randomly orientated on the nonwoven sheet.

18. The cleaning pad of claim 16, wherein the spot bonds are orientated in a line that forms at least a portion of a sleeve for receiving an attachment member of a cleaning tool.

19. The cleaning pad of claim 16, wherein the joining line comprises a central bonding line.

20. The cleaning pad of claim 19, wherein the spot bonds are arranged in lines on opposed sides of the central bonding line to form sleeves for receiving attachment members of a cleaning tool.

21. The cleaning pad of claim 15, wherein between 5-70% of the fibers are joined at at least one spot bond.

22. The cleaning pad of claim 15, wherein less than 80% of the fibers are joined by at least one spot bond.

23. The cleaning pad of claim 19, wherein the central bonding line is discontinuous.

24. The cleaning pad of claim 23, wherein between 10-90% of the fibers are joined to the discontinuous central bonding line.

25. The cleaning pad of claim 24, wherein about 80% of the fibers are joined to the discontinuous central bonding line.

26. The cleaning pad of claim 19, wherein 80% of the total fiber bundle comprises fibers that are free along at least 50% of their length from the central bonding line.

27. A cleaning pad comprising:
fiber bundles attached to a nonwoven sheet by a plurality of spot bonds wherein the length of a fiber from a binding site to a free end of a fiber bundle differs from a length of a fiber in an adjacent fiber bundle, and
a retaining sheet attached to the nonwoven sheet by the spot bonds on one side of the nonwoven sheet opposite the fiber bundles.

28. The cleaning pad of claim 27, wherein the spot bonds define a plurality of discrete fiber clusters and form micro channels between the fibers of the fiber clusters.

29. The cleaning pad of claim 28, wherein the spot bonds are randomly orientated on the nonwoven sheet.

30. The cleaning pad of claim 28, wherein the spot bonds are orientated in lines.

31. The cleaning pad of claim 28, wherein the fiber clusters are defined by a plurality of individual fibers branching from a single spot bond.

32. A cleaning pad comprising:
a base sheet;
a retaining sheet bonded to one side of the base sheet by a plurality of spot bonds defining a portion of a sleeve for receiving an attachment member of a cleaning tool; and
a fiber bundle connected to the base sheet by the spot bonds.

33. The cleaning pad of claim 32, wherein an outer edge of the base sheet is rectangular and is defined by a straight uncut upper edge, a straight uncut lower edge and two straight, unperforated, uncut side edges.

34. The cleaning pad of claim 32, wherein an outer edge of the base sheet is nonlinear.

35. The cleaning pad of claim 32, wherein about 100% of fibers in the fiber bundle are connected to the base sheet at a central bonding line and between 5-90% of the fibers in the fiber bundle are connected to the base sheet by at least one spot bond.

36. The cleaning pad of claim 32, wherein the spot bonds are triangular shaped spots.

37. The cleaning pad of claim 32, wherein the spot bonds are star-shaped spots.

38. A cleaning pad comprising:
a base sheet;
a retaining sheet attached to one side of the base sheet by a plurality of spot bonds forming at least a portion of a sleeve for receiving an attachment member of a cleaning tool and
a fiber bundle comprising a first set of fibers bonded to a base sheet only by a central bonding line and a second set of fibers bonded to the base sheet by the central bonding line and at least one of the plurality of spot bonds.

39. The cleaning pad of claim 32, further comprising a central bonding line that bonds the base sheet, the retaining sheet and the fiber bundle together.

40. The cleaning pad of claim 32, further comprising a plurality of cuts in an edge of the base sheet.

41. The cleaning pad of claim 32, further comprising a central bonding line attaching the fiber bundle and the retaining sheet to the base sheet.

42. The cleaning pad of claim 41, wherein the spot bonds are arranged in lines on opposed sides of the central bonding line.

* * * * *